United States Patent
Mitchell et al.

(10) Patent No.: US 11,182,634 B2
(45) Date of Patent: Nov. 23, 2021

(54) SYSTEMS AND METHODS FOR MODIFYING LABELED CONTENT

(71) Applicant: Disney Enterprises, Inc., Burbank, CA (US)

(72) Inventors: Kenneth Mitchell, Burbank, CA (US); Caio Jose dos Santos Brito, Recife (BR)

(73) Assignee: Disney Enterprises, Inc., Burbank, CA (US)

( * ) Notice: Subject to any disclaimer, the term of this patent is extended or adjusted under 35 U.S.C. 154(b) by 116 days.

(21) Appl. No.: 16/268,443

(22) Filed: Feb. 5, 2019

(65) Prior Publication Data

US 2020/0250457 A1 Aug. 6, 2020

(51) Int. Cl.
*G06K 9/34* (2006.01)
*G06K 9/00* (2006.01)
*G06K 9/62* (2006.01)

(52) U.S. Cl.
CPC ........... *G06K 9/342* (2013.01); *G06K 9/0061* (2013.01); *G06K 9/00281* (2013.01); *G06K 9/6206* (2013.01)

(58) Field of Classification Search
CPC ............. G06K 9/00281; G06K 9/0061; G06K 9/00671; G06K 9/342; G06K 9/6206
See application file for complete search history.

(56) References Cited

U.S. PATENT DOCUMENTS

| | | | |
|---|---|---|---|
| 2010/0030578 A1* | 2/2010 | Siddique | G06Q 40/12 705/3 |
| 2012/0309520 A1* | 12/2012 | Evertt | A63F 13/655 463/31 |
| 2016/0144278 A1* | 5/2016 | el Kaliouby | A63F 13/825 463/36 |

* cited by examiner

*Primary Examiner* — Manuchehr Rahmjoo
(74) *Attorney, Agent, or Firm* — Artegis Law Group, LLP

(57) ABSTRACT

Systems and methods are disclosed for modifying labeled target content for a capture device. A computer-implemented method may use a computer system that includes non-transient electronic storage, a graphical user interface, and one or more physical computer processors. The computer-implemented method may include: obtaining labeled target content, the labeled target content including one or more facial features that have been labeled; modifying the labeled target content to match dynamically captured content from a first capture device to generate modified target content; and storing the modified target content. The dynamically captured content may include the one or more facial features.

19 Claims, 17 Drawing Sheets
(12 of 17 Drawing Sheet(s) Filed in Color)

SYSTEMS AND METHODS FOR MODIFYING LABELED CONTENT

TECHNICAL FIELD

The present disclosure relates generally to modifying labeled content.

BRIEF SUMMARY OF THE DISCLOSURE

Embodiments of the disclosure are directed to systems and methods for modifying labeled content.

In accordance with the technology described herein, a method may be implemented in a computer system that may include non-transient electronic storage, one or more physical computer processors, and a graphical user interface. The computer-implemented method may include one or more operations. One operation may include obtaining, from the non-transient electronic storage, labeled target content that may include one or more facial features that have been labeled. One operation may include modifying, with one or more physical computer processors, the labeled target content to match dynamically captured content from a first capture device to generate modified target content. The dynamically captured content may include the one or more facial features. One operation may include storing, in the non-transient electronic storage, the modified target content.

In embodiments, the one or more facial features may include one or more mouth features.

In embodiments, modifying the labeled target content may include cropping, with the one or more physical computer processors, the labeled target content such that the one or more mouth features are in cropped target content. Modifying the labeled target content may include warping, with the one or more physical computer processors, the cropped target content to match the dynamically captured content corresponding to the one or more mouth features.

In embodiments, the one or more facial features may also include one or more eye features.

In embodiments, modifying the labeled target content may include rotating, with the one or more physical computer processors, the labeled target content based on an angle of the dynamically captured content to generate rotated target content. Modifying the labeled target content may include cropping, with the one or more physical computer processors, the rotated target content such that the one or more eye features are in cropped target content. Modifying the labeled target content may include warping, with the one or more physical computer processors, the cropped target content to match the dynamically captured content corresponding to the one or more eye features.

In embodiments, the computer-implemented method may further include generating, with the one or more physical computer processors, the one or more facial features in the dynamically captured content using the modified target content.

In embodiments, generating the one or more facial features may include estimating, with the one or more physical computer processors, one or more bounding boxes around parts of the face in the dynamically captured content using one or more facial parameters in the dynamically captured content to generate the one or more facial features from the dynamically captured content. The one or more facial parameters may include one or more of a color, a curve, and a reflected light intensity. Generating the one or more facial features may include generating, with the one or more physical computer processors, the one or more facial features in the dynamically captured content using the one or more bounding boxes. Generating the one or more facial features may include identifying, with the one or more physical computer processors, a closed eye when a given image in converted captured content is within a first threshold range. The converted captured content may be derived from the dynamically captured content. Generating the one or more facial features may include generating, with the one or more physical computer processors, a position of a pupil when a portion of the given image in the converted captured content is within a second threshold range.

In embodiments, the computer-implemented method may further include dynamically generating, with the one or more physical computer processors, a representation of a face using visual effects to depict the one or more facial features, and displaying, via the graphical user interface, the representation.

In embodiments, the first capture device may be different from a second capture device used to capture the labeled target content such that the dynamically captured content is distorted differently than the labeled target content.

In embodiments, modifying the labeled target content may include converting, with the one or more physical computer processors, the labeled target content into converted content, wherein the converted content uses a different color format than the labeled target content.

In embodiments, the capture device may include a head mounted display. The head mounted display may include a red-green-blue camera capturing one or more mouth features. The head mounted display may include an infrared camera capturing one or more eye features. The head mounted display may include an infrared illuminator capturing the one or more eye features.

In accordance with additional aspects of the present disclosure, a method for modifying labeled target content for a first capture device may be implemented in a computer system that may include non-transient electronic storage, one or more physical computer processors, and a graphical user interface. The computer-implemented method may include one or more operation. One operation may include obtaining, from the non-transient electronic storage, the modified target content. The modified target content may match a distortion of the first capture device. One operation may include generating, with the one or more physical computer processors, the one or more facial features in the dynamically captured content using the modified target content. One operation may include dynamically generating, with the one or more physical computer processors, a representation of a face using visual effects to depict one or more of the one or more facial features and the changes to the one or more facial features. One operation may include displaying, via the graphical user interface, the representation.

In embodiments, modifying the labeled target content may include cropping, with the one or more physical computer processors, the labeled target content such that the one or more mouth features are in cropped target content. Modifying the labeled target content may include warping, with the one or more physical computer processors, the cropped target content to match the dynamically captured content corresponding to the one or more mouth features.

In embodiments, modifying the labeled target content may include rotating, with the one or more physical computer processors, the labeled target content based on an angle of the dynamically captured content to generate rotated target content. Modifying the labeled target content may include cropping, with the one or more physical computer processors, the rotated target content such that the one or more eye features are in cropped target content. Modifying the labeled target content may include warping, with the one or more physical computer processors, the cropped target content to match the dynamically captured content corresponding to the one or more eye features.

In embodiments, generating the one or more facial features may include estimating, with the one or more physical computer processors, one or more bounding boxes around parts of the face in the dynamically captured content using one or more facial parameters in the dynamically captured content to identify the one or more facial features from the dynamically captured content. The one or more facial parameters may include one or more of a color, a curve, and a reflected light intensity. Generating the one or more facial features may include generating, with the one or more physical computer processors, the one or more facial features in the dynamically captured content using the one or more bounding boxes. Generating the one or more facial features may include identifying, with the one or more physical computer processors, a closed eye when a given image in converted captured content is within a first threshold range. The converted captured content may be derived from the dynamically captured content. Generating the one or more facial features may include generating, with the one or more physical computer processors, a position of a pupil when a portion of the given image in the converted captured content is within a second threshold range.

In embodiments, the capture device may include a head mounted display. The head mounted display may include a red-green-blue camera capturing one or more mouth features. The head mounted display may include an infrared camera capturing one or more eye features. The head mounted display may include an infrared illuminator capturing the one or more eye features.

In accordance with addition aspects of the present disclosure, a system to modify labeled target content. The system may include a non-transient electronic storage, a graphical user interface, and one or more physical computer processors. The one or more physical computer processors may be configured by machine-readable instructions to perform a number of operations. One such operation is to obtain, from the non-transient electronic storage, labeled target content that may include one or more facial features that have been labeled. Another such operation is to modify, with the one or more physical computer processors, the labeled target content to match dynamically captured content from a first capture device to generate modified target content. The dynamically captured content may include the one or more facial features. Another such operation is to store, in the non-transient electronic storage, the modified target content.

In embodiments, modifying the labeled target content may include cropping, with the one or more physical computer processors, the labeled target content such that the one or more mouth features are in cropped target content. Modifying the labeled target content may include warping, with the one or more physical computer processors, the cropped target content to match the dynamically captured content corresponding to the one or more mouth features.

In embodiments, modifying the labeled target content may include rotating, with the one or more physical computer processors, the labeled target content based on an angle of the dynamically captured content to generate rotated target content. Modifying the labeled target content may include cropping, with the one or more physical computer processors, the rotated target content such that one or more eye features are in cropped target content. Modifying the labeled target content may include warping, with the one or more physical computer processors, the cropped target content to match the dynamically captured content corresponding to the one or more eye features.

In embodiments, the one or more physical computer processors are further configured by the machine-readable instructions to perform a number of operations. One such operation is to estimate, with the one or more physical computer processors, one or more bounding boxes around parts of the face in the dynamically captured content using one or more facial parameters in the dynamically captured content to identify the one or more facial features from the dynamically captured content. The one or more facial features may include one or more of a color, a curve, and a reflected light intensity. Another such operation is to generate, with the one or more physical computer processors, the one or more facial features in the dynamically captured content using the one or more bounding boxes. Another such operation is to identify, with the one or more physical computer processors, a closed eye when a given image in converted captured content is within a first threshold range. The converted captured content may be derived from the dynamically captured content. Another such operation is to generate, with the one or more physical computer processors, a position of a pupil when a portion of the given image in the converted captured content is within a second threshold range.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The patent or application filed contains at least one drawing executed in color. Copies of this patent or patent application publication with color drawing(s) will be provided by the Office upon request and payment of the necessary fee.

Further aspects of the present disclosure will be more readily appreciated upon review of the detailed description of the various disclosed embodiments, described below, when taken in conjunction with the accompanying figures.

Figure 1:
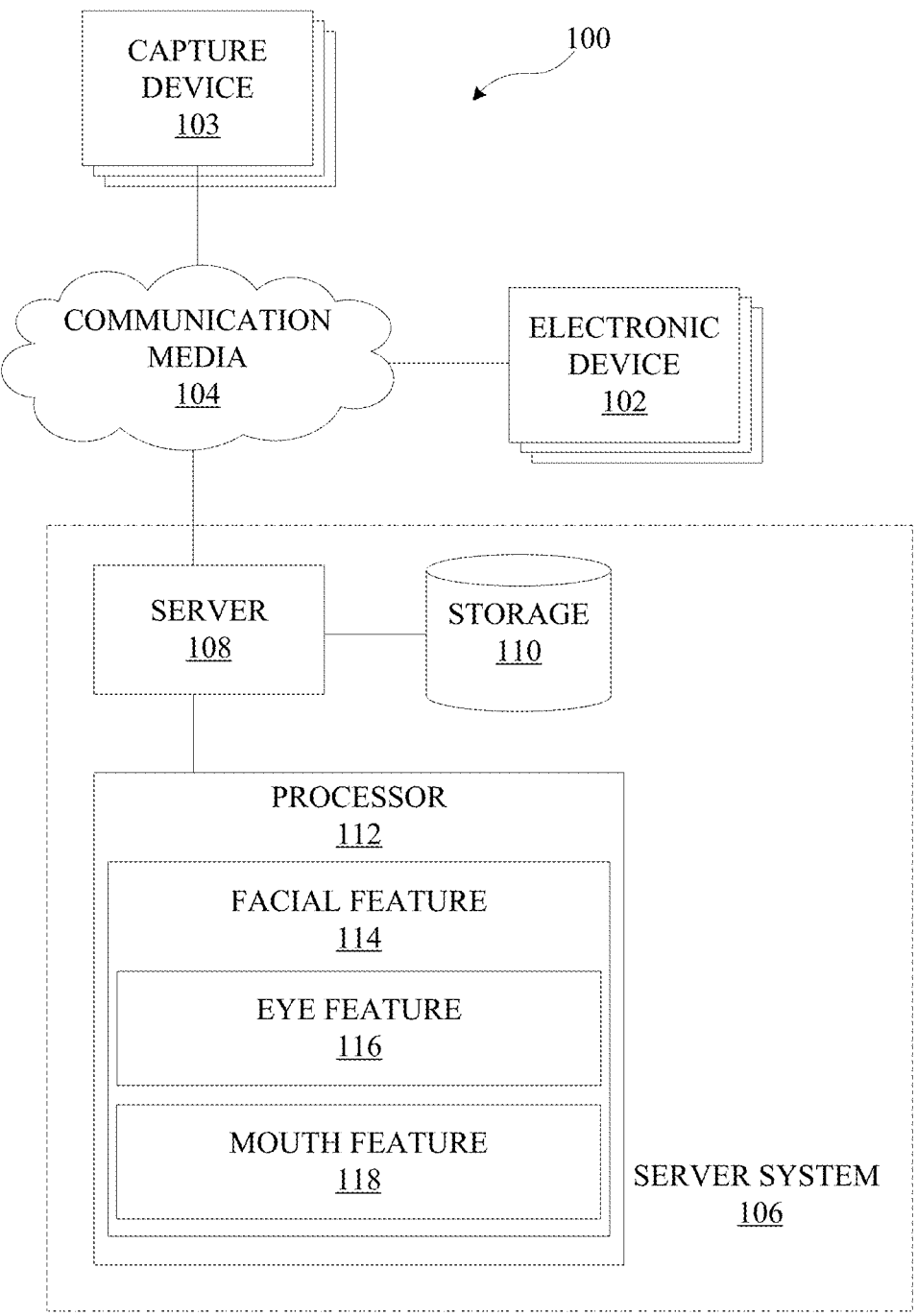
FIG. 1 illustrates an example system for modifying labeled content, in accordance with various embodiments.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Acquiring manually labeled training content for a specific application can be very expensive and while such content may be available for casual camera imagery, this content may not be a good fit for other capture devices. Various embodiments of the present disclosure are directed to a method or system for modifying labeled content. Content, which may be referred to herein as target content, may include different resolution images (e.g., standard, high definition (HD), ultra HD (UHD), 4k UHD, 8k UHD, and/or other resolutions). The target content may include one or more images of one or more features that have been labeled. For example, the features may be one or more facial features of one or more people. The target content may be labeled, such that one or more facial features are pre-identified in the target content. In embodiments, the labeled target content may include a set of landmark labeled, or facial feature labeled, casual photography of one or more people's faces with different, arbitrary poses from one or more regular camera lenses with significantly different intrinsics (e.g., lens types, f-stop values, ISO values, etc.). For example, a labeled target image may include pre-labeled facial features identifying different parts of the face, as will be described in greater detail herein. It should be appreciated that other labeled features may be used in modifying labeled target content (e.g., skeletal system, arms, hands, fingers, legs, feet, toes, backs, fronts, etc.)

Modifying labeled target content may include modifying labeled target content. Modifying the labeled target content may include breaking up different facial features (e.g., eye features, mouth features, cheek features, etc.) Labeled target content may have pre-identified facial features. The one or more facial features may be rotated, cropped, and/or warped such that the modified target content matches the distortion, size, reflectivity, etc. of the dynamically captured content. In embodiments, the modified target content may be used as training content to generate the one or more facial features in the dynamically captured content that has not been pre-labeled with the one or more facial features. In some embodiments, the one or more generated facial features may be recorded and stored to generate new sets of labeled target content. The one or more generated facial features may be used in generating a representation of a face, such as, for example, an animated avatar. The representation may be displayed on a graphical user interface.

Before describing the technology in detail, it may be useful to describe an example environment in which the presently disclosed technology can be implemented. FIG. 1 illustrates one such example environment 100.

Environment 100 may be used in connection with implementing embodiments of the disclosed systems, methods, and devices. By way of example, the various below-described components of FIG. 1 may be used to modify labeled target content for a capture device, generate one or more facial features from dynamically captured content using modified target content, and use the one or more facial features to generate a representation. Target content and dynamically captured content may include images, video, and/or other content. Dynamically captured content may have been captured using a first capture device. Target content may have been captured using one or more second capture devices.

Figure 2:
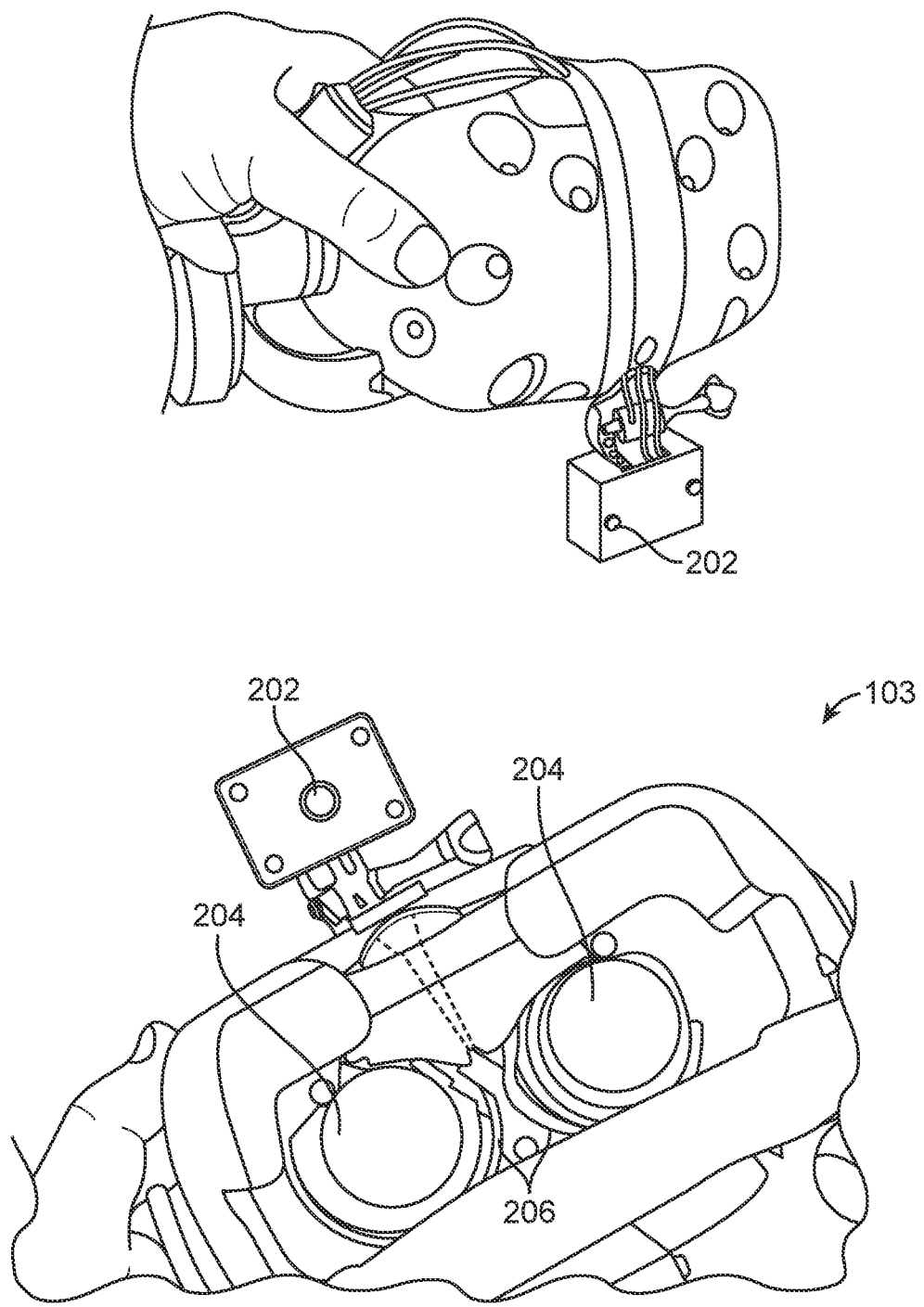
FIG. 2 illustrates an example capture device, in accordance with various embodiments of the present disclosure.

As illustrated, first capture device may correspond to capture device 103. FIG. 2 illustrates an example capture device, in accordance with various embodiments of the present disclosure. Capture device 103 may include one or more of Red-Green-Blue (RGB) camera 202, infrared (IR) camera 204, and IR illuminator 206. In embodiments, RGB camera 202 may include a wide angle lens. In some embodiments, capture device may include additional capture devices. In embodiments, capture device 103 may include a head-mounted display for use in AR/VR systems. The first capture device may be different from the second capture device. For example, a distortion created by a lens on the first capture device may be different than a distortion created by a lens on the second capture device. It should be appreciated that other differences may exist between the first capture device and the second capture device (e.g., lens type, lens angle, chromatic aberration, f-stop, ISO, sensor, different color formats, etc.)

Target content and dynamically captured content may include one or more facial features and/or other features. The one or more facial features may include one or more eye features, one or more mouth features, one or more cheek features, and/or other facial features. The dynamically captured content may include a video stream and/or an image of individual eyes, a mouth, cheeks, and/or other parts of the face. In embodiments, the dynamically captured content may include the whole face with a single image and/or video. Referring back to FIG. 1, server system 106 may include facial feature component 114, eye feature component 116, and mouth feature component 118, as will be described herein. Facial feature component 114 may be used with respect to the one or more facial features in the target content and the dynamically captured content, eye feature component 116 may be used with respect to the one or more eye features in the target content and the dynamically captured content, and mouth feature component 118 may be used with respect to the one or more mouth features in the target content and the dynamically captured content.

Facial feature component 114 may be used with respect to the one or more facial features. Facial feature component 114 may include eye feature component 116 and mouth feature component 118. Facial feature component 114 may modify labeled target content to match the dynamically captured content from the first capture device.

In embodiments, facial feature component 114 may generate the one or more facial features for the dynamically captured content. Using bounding boxes for individual ones of the eyes, mouth, cheeks, and/or other parts of the face and/or the modified training content as input, a facial feature prediction algorithm may be used to generate the one or more facial features for the dynamically captured content. The facial feature prediction algorithm may include an eye feature prediction algorithm, a mouth feature prediction algorithm, a cheek feature prediction algorithm, and/or other facial feature prediction algorithms. For example, a shape predictor may use a learning rate of about 0.1, a tree depth of about 4, a cascade depth of about 10, and a number of trees per cascade level of about 500.

In one example, the dynamically captured content may include multiple frames. An eye may be open in a first frame and closed in a second frame. Facial feature component 114 may identify an open eye in the first frame and a closed eye in the second frame. In some embodiments, the one or more identified dynamically captured content may be stored to be used as training content.

In embodiments, facial feature component 114 may be used to dynamically generate a representation of a face based on dynamically captured content. For example, the representation may open its mouth or blink its eyes corresponding to the person in the dynamically captured content opening her mouth or blinking her eyes, respectively. In embodiments, the representation may be calibrated by measuring distances between individual ones of the one or more facial features in a facial position.

The representation may use visual effects to depict the one or more facial features. In embodiments, a visual effect may include one or more visual transformations of the representation and/or graphics. A visual transformation may include one or more visual changes in how the representation is presented or displayed. In some embodiments, a visual transformation may include one or more of a color gradient, a visual zoom, a visual filter, a visual rotation, and/or a visual overlay (e.g., text and/or graphics overlay). The visual effects may illustrate an avatar that simulates the facial movement of a person that is being captured by capture device 103.

Figure 3:
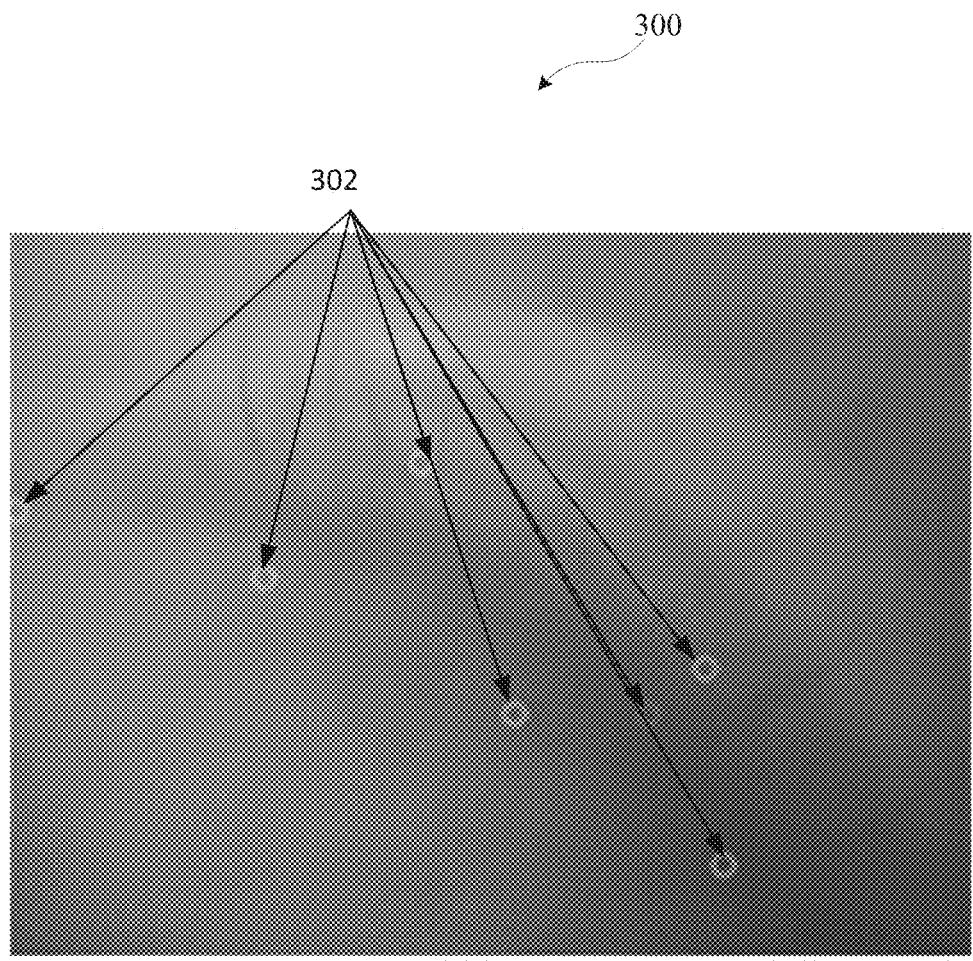
FIG. 3 illustrates seven eye features for dynamically captured eye content, in accordance with various embodiments of the present disclosure.

Eye feature component 116 may be used with respect to the one or more eye features. The one or more eye features may include one or more landmarks identifying a part of an eye. FIG. 3 illustrates eye features and pupil estimation 302, or landmarks, for dynamically captured eye content 300, in accordance with various embodiments of the present disclosure. It should be appreciated that more or fewer eye features may be used. As illustrated, the eye features may identify the ends of the eye, the middle of the eye, and other parts of the eye. The labeled target content may include one or more labels for the one or more eye features.

Figure 4:
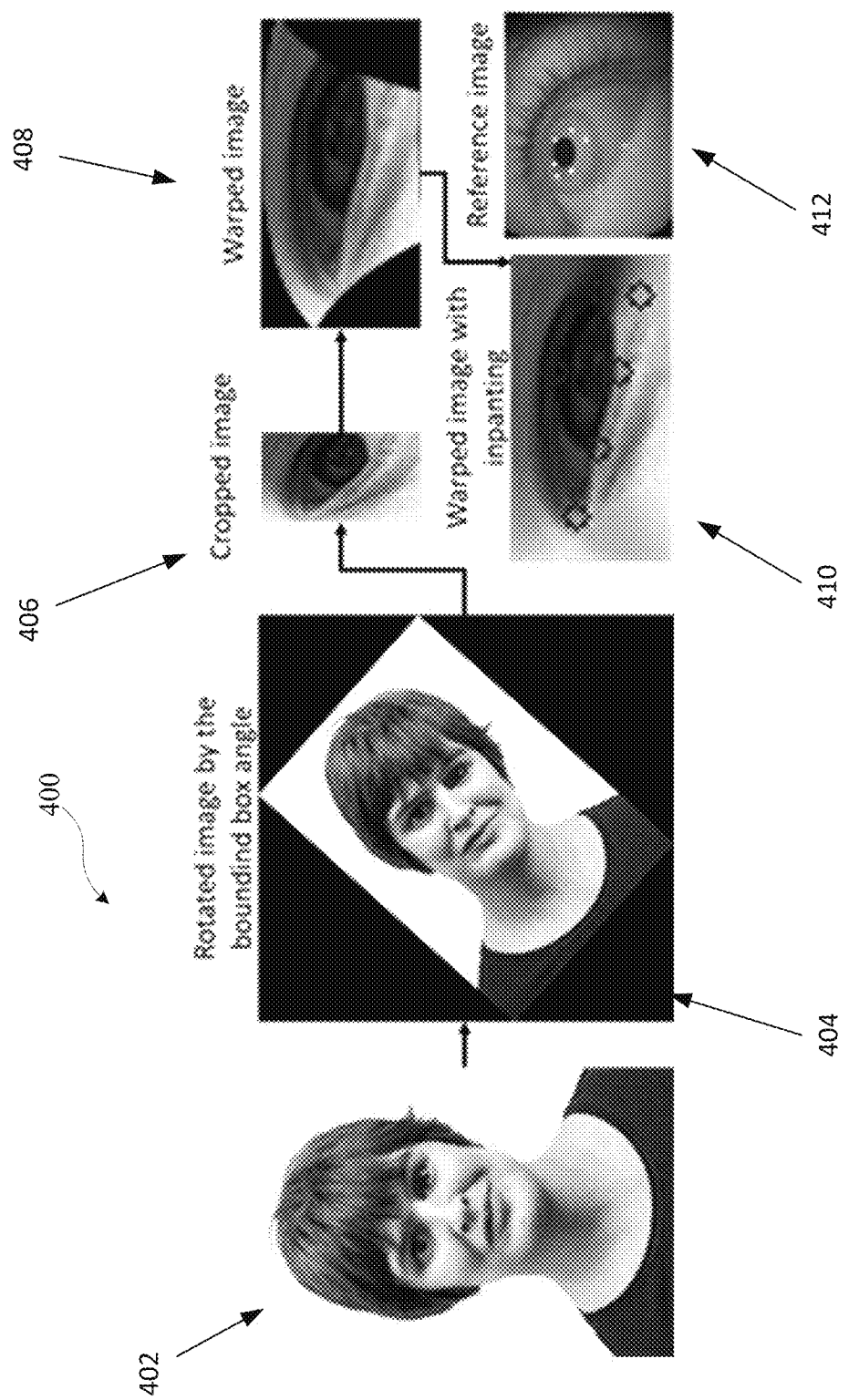
FIG. 4 illustrates an example modification workflow, in accordance with various embodiments of the present disclosure.

Referring back to FIG. 1, eye feature component 116 may modify the labeled target content to match the dynamically captured content from the first capture device. Modifying the labeled target content for the one or more eye features may include rotating the labeled target content based on an angle of the dynamically captured content to generate rotated target content. For example, FIG. 4 illustrates example modification workflow 400, in accordance with various embodiments of the present disclosure. 402 illustrates an example of labeled target content. 404 illustrates rotating the labeled target content about 0.8 degrees from the x-axis with a Euler angle rotation. The about 0.8 degree rotation may be used because reference image 412 rotates the eye about 0.8 degrees. For different capture devices, the amount of rotation may be different.

Modifying the labeled target content for the one or more eye features may include cropping the rotated target content such that the one or more eye features are in cropped target content. For example, referring back to FIG. 4, 406 illustrates an example of cropping rotated target content. The cropping may take the smallest rectangular part of the rotated target content that includes all of the one or more eye features in the rotated target content. In embodiments, the rectangular part that may be used to crop multiple rotated target content may use a single aspect ratio (e.g., all cropped images have a 3:2 aspect ratio). In some embodiments, different shapes may be used to crop the rotated target content (e.g., circular, oval, triangular, diamond, etc.). In embodiments, different shapes and/or aspect ratios may be used for individual ones of the rotated target content to match the dynamically captured content. In embodiments, cropping may include scaling the cropped image to match a size of the dynamically captured content.

Modifying the labeled target content for the one or more eye features may include warping the cropped target content to match the dynamically captured content corresponding to the one or more eye features. For example, referring back to FIG. 4, 408 illustrates an example of warping cropped target content. The warping may be, for example, spherical warping, such that the center of the cropped target content may be magnified more and the edges of the cropped target content may be magnified less. In this example, spherical warping may be used because it approximates an effect of the lens in the dynamically captured content better than other warping effects. A center of the warping may be applied to the center of the average position of the one or more eye features for an individual eye. It should be appreciated that for different capture devices, the warping may be different. In embodiments, warping may include inpainting any empty regions in the warped target content that may have been caused by the warping or otherwise, as illustrated in 410.

Figure 5:
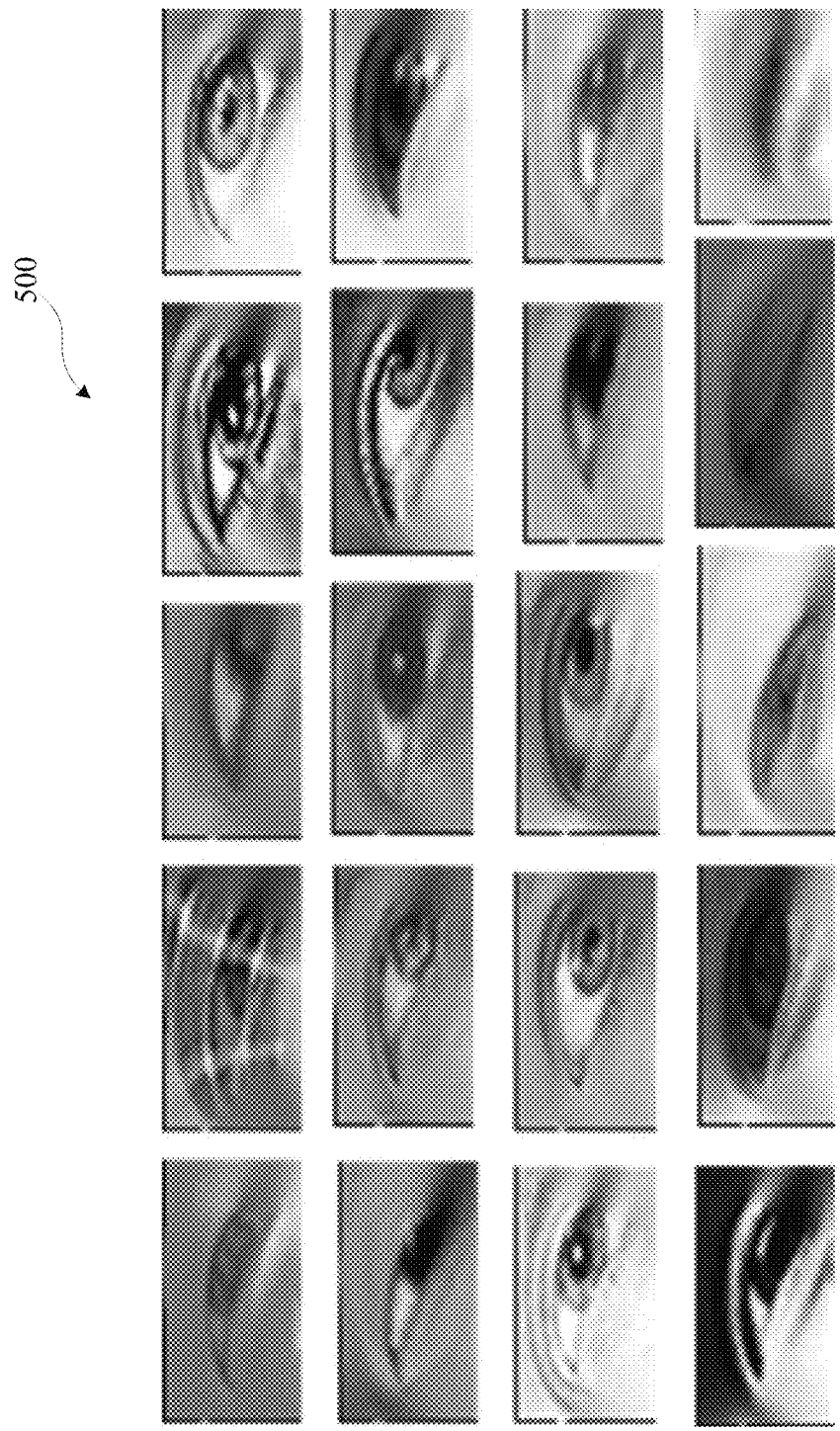
FIG. 5 illustrates example modified target eye content, in accordance with various embodiments of the present disclosure.

The modification to the labeled target content may be applied to all of the labeled target content to generate modified target content. Referring back to FIG. 1, eye feature component 116 may store modified target content which can be used as training content for dynamically captured content from the first capture device. For example, FIG. 5 illustrates example modified target eye content, in accordance with various embodiments of the present disclosure.

Referring back to FIG. 1, eye feature component 116 may generate the one or more eye features in the dynamically captured content using the modified target content. Generating the one or more eye features in the dynamically captured content using the modified target content may include using the dynamically captured content corresponding to the eye (e.g., the capture device that captures one or more of the eyes). Using the modified target content corresponding to the eye as training content, an estimate of a position for the one or more eye features can be generated. Using the entire dynamically captured content corresponding to the eye as a bounding box for the eye as input, the eye feature prediction algorithm may be used to generate the one or more eye features for the dynamically captured content. The eye feature prediction algorithm may estimate the one or more eye features based on an ensemble of regression trees. The ensemble may have a learning rate of about 0.1, a tree depth of about 4, a cascade depth of about 10, and a number of trees per cascade level of about 500. The eye feature prediction algorithm may be used per eye.

In embodiments, using the modified target content, an eye template comprising an average range of the one or more eye features in the modified training content may be generated. Applying the eye template to the dynamically captured content corresponding to the eye may be used to generate the one or more eye features for the dynamically captured content. In embodiments, parameters of the eye template may be narrowed (i.e., narrowing the range of the one or more eye features) to improve the position of the one or more eye features on the dynamically captured content. This calibration, which may include generating the one or more eye features and/or improving the position of the one or more eye features, may occur every frame of a video, every 30 seconds, every minute, once per session of the capture device, and/or other periods of time.

In embodiments, generating the one or more eye features in the dynamically captured content using the modified target content may include estimating a bounding box around the eye in the dynamically captured content using one or more eye parameters to generate the one or more eye features. In some embodiments, the one or more eye parameters may include a position on the face (e.g., an upper half of a face), a shape of an eye (e.g., two curves meeting at the end, diamond-like, circular, oval, etc.), a color change (e.g., skin tone to whites of the eyes), a texture change (e.g., reflectivity, roughness, smoothness, etc.), and/or other parameters. In embodiments, the one or more eye parameters may be used to estimate a bounding box. In some embodiments, the eye template may be used as a filter, by scanning the eye template across multiple positions of the dynamically captured content to identify shapes that are within a threshold value of the eye template shape. Using a center of identified eye shapes, a bounding box may be generated and placed around the center of the identified eye shapes to limit the application of the eye template to the bounding box. The eye template may be used on identified eye shapes in the dynamically captured content to generate the one or more eye features for the dynamically captured content, as described above.

Eye feature component 116 may generate a position for the one or more eye features in the dynamically captured content. For example, a first eye feature may be in a first position in a first frame, in a second position in a second frame, in a third position in a third frame, and in a first position in a fourth frame. This may correspond to squinting, blinking, widening, and/or other movements of the eye.

In embodiments, eye feature component 116 may identify a closed eye using converted captured content. Converted captured content may include content that has been processed in a different color format, or which has been otherwise derived from the dynamically captured content. For example, the dynamically captured content may be captured using a RGB camera, an IR camera, and/or an IR illuminator. The RGB camera may capture RGB content. Converted captured content may be RGB content converted into Hue-Saturation-Value (HSV) content. The converted captured content (e.g., HSV content) may be compared to a threshold range for one or more of the values (e.g., H, S, and/or V). For example, an eye may be determined to be closed when the threshold range is between about 220 and about 225 for the V channel in HSV. In some embodiments, the IR illuminator and IR camera may be used to identify a number of reflection pixels from the eye. A reflection pixel may be when the IR camera receives an IR light ray reflected off the eye from the IR illuminator. For example, when the number of reflection pixels is less than 10, the eye may be determined to be closed. In embodiments, multiple thresholds (e.g., the eye color threshold range and/or the IR eye threshold) may be used to confirm and cross-check other signs for whether an eye is closed. It should be appreciated that the labeled target data may be converted into any other color format using different source color format and/or target color formats.

Figure 6:
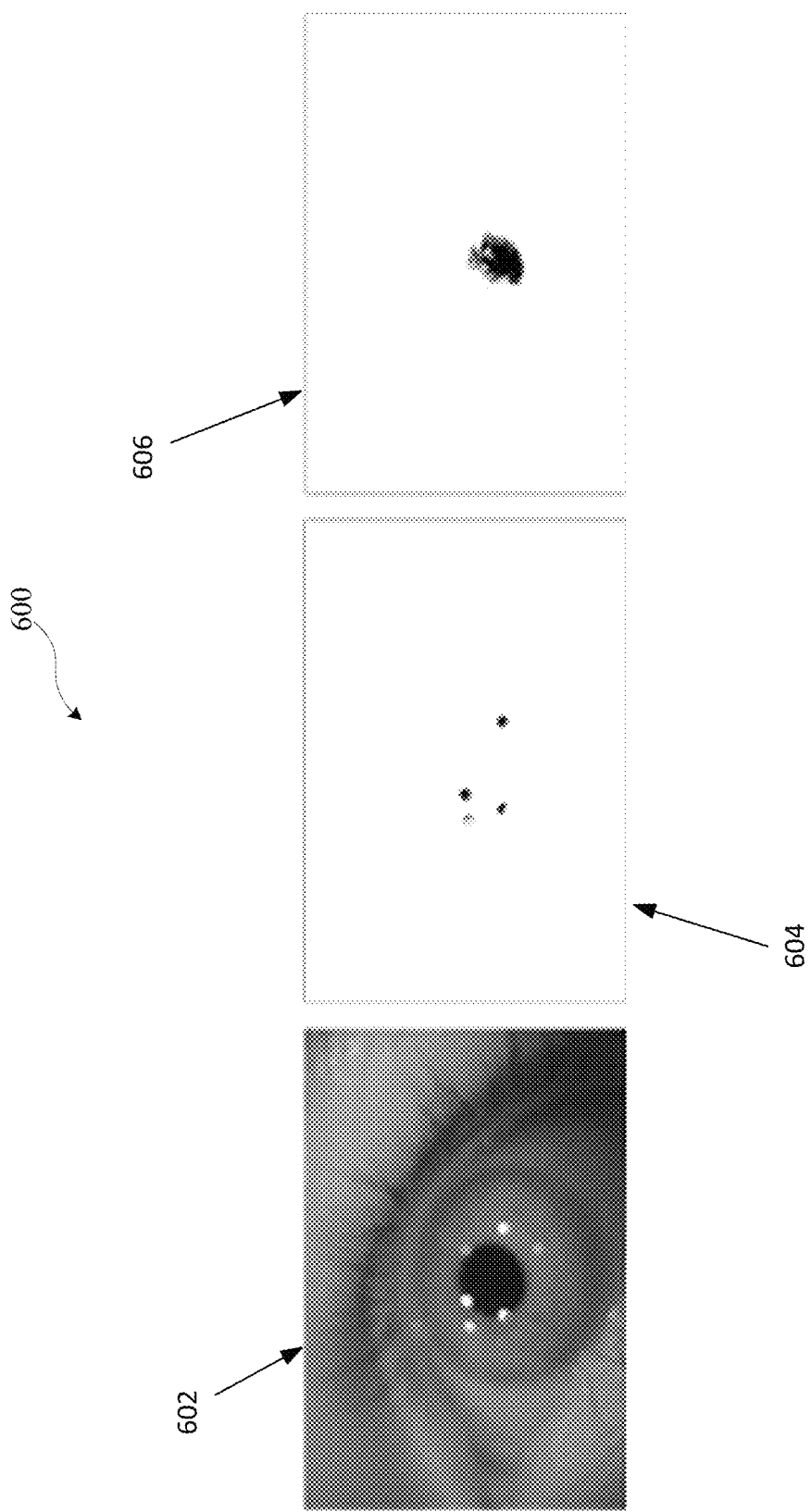
FIG. 6 illustrates an example converted captured content, in accordance with various embodiments of the present disclosure.

FIG. 6 illustrates an example converted captured content, in accordance with various embodiments of the present disclosure. 602 illustrates an example of dynamically captured content. 604 illustrates a converted image of an eye using an IR camera to capture reflections from an IR illuminator. 606 illustrates a converted image of a pupil in the HSV channel after a threshold has been applied to the converted image.

In some embodiments, generating a position for the one or more eye features in the dynamically captured content may include generating a position for a pupil when a part of the given image in the converted captured content is within a second threshold range. For example, the converted captured content may be RGB content converted into HSV content. The converted captured content may be compared to a threshold range for one or more of the values (e.g., H, S, and/or V). For example, the pupil may be determined to be in a part of the dynamically captured content that has a value between about 0 and about 10 of the V channel. In some embodiments, a center of the pupil may be estimated based on an average center using the bounding box for the eye and/or the one or more eye features. The one or more generated eye features may be stored to be used as training content.

In embodiments, referring back to FIG. 1, eye feature component 116 may dynamically generate a representation of a face based on dynamically captured content. For example, the representation may blink its eyes corresponding to the person in the dynamically captured content blinking her eye. Eye feature component 116 may use the one or more generated eye features to generate the representation. For example, since one or more eye features have been generated, an eye blink, squint, etc. and a movement of a pupil may be captured from the dynamically captured content. This may be processed in server system 106 to generate a representation of a face that simulates the one or more eye features captured. The representation may use visual effects to depict the one or more eye features, as described above.

Figure 7:
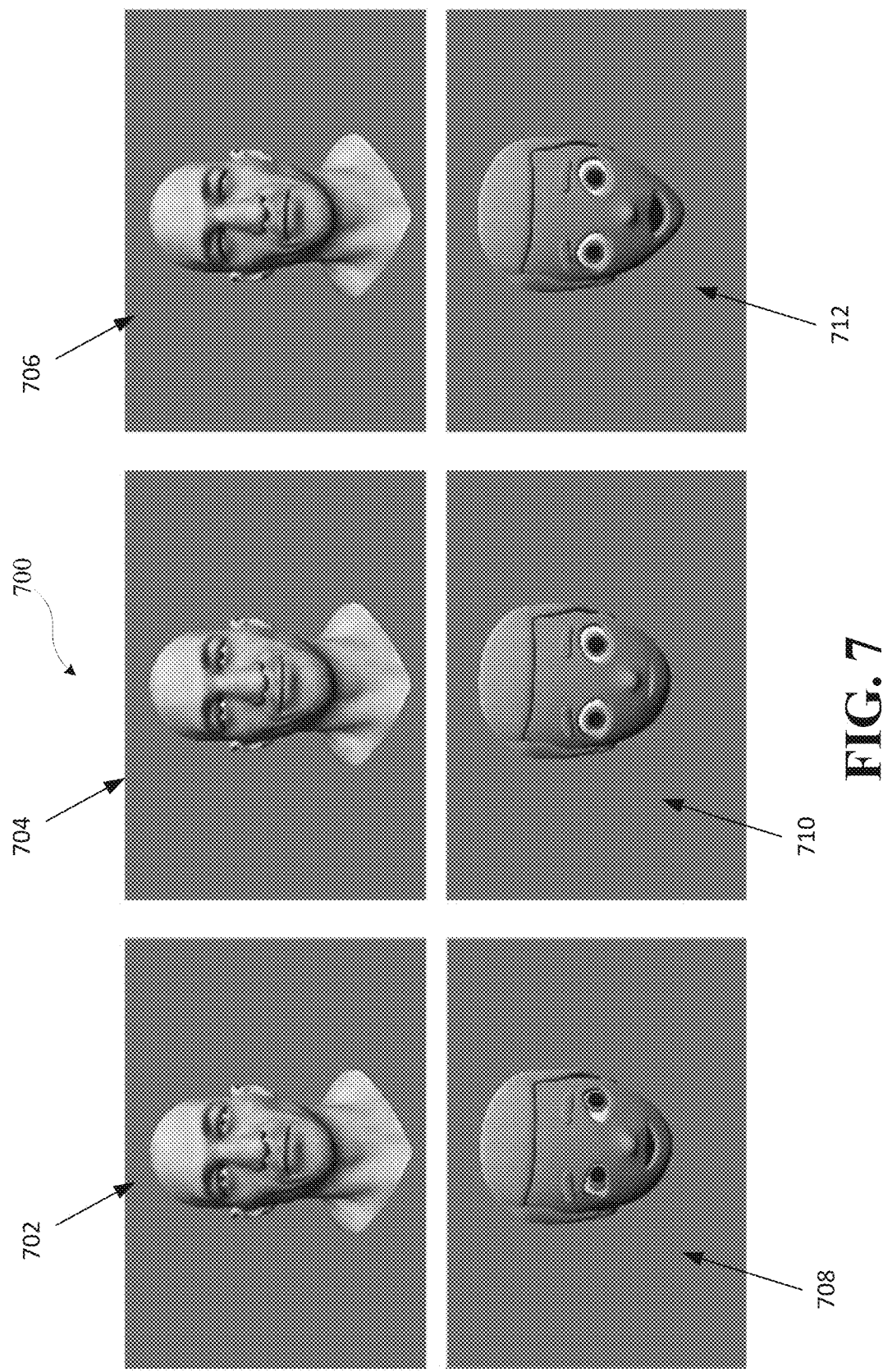
FIG. 7 illustrates example representations, in accordance with various embodiments of the present disclosure.

The representation may be displayed on electronic device 102. FIG. 7 illustrates example representations, in accordance with various embodiments of the present disclosure. 702, 704, and 706 may illustrate a more realistic representation of a person, while 708, 710, and 712 may be more similar to a virtual avatar. 702 may illustrate a neutral face position. 704 may illustrate a smiling position. 706 may illustrate a closed eye position. 710 may illustrate the representation looking right. 712 may illustrate a pout shape. 714 may illustrate the representation with its mouth open.

Figure 8:
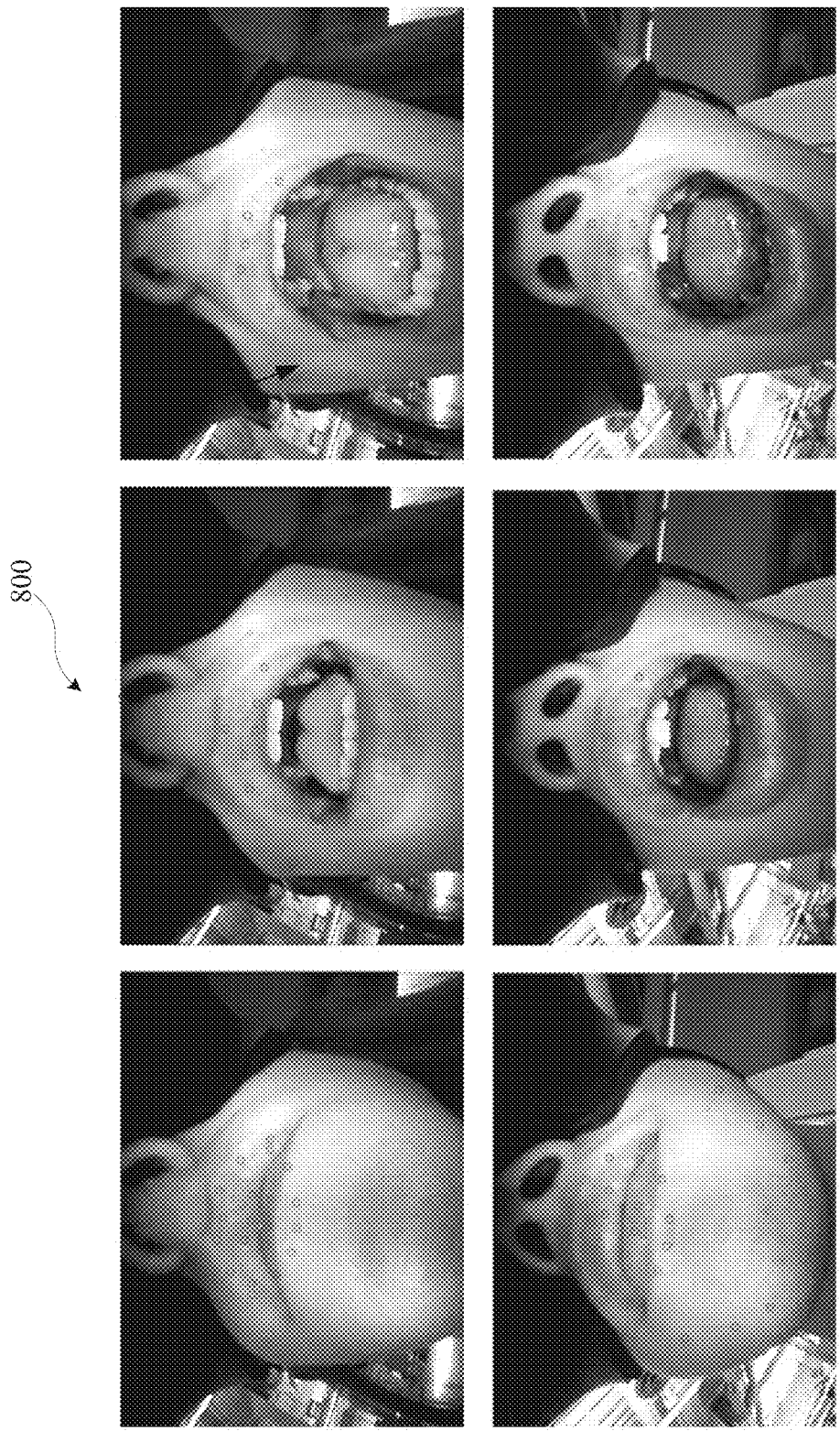
FIG. 8 illustrates one or more example mouth features and cheek features, in accordance with various embodiments of the present disclosure.

Referring back to FIG. 1, mouth feature component 118 may be used with respect to the one or more mouth features. The one or more mouth features may include one or more landmarks identifying a part of a mouth. FIG. 8 illustrates one or more example mouth features and one or more cheek features, in accordance with various embodiments of the present disclosure. As illustrated, there may be twenty mouth features and seven cheek features. It should be appreciated that more or fewer mouth features and/or cheek features may be used. As illustrated, the mouth features may identify the an edge of the mouth, middle upper parts of the mouth, and middle lower parts of the mouth. It should be appreciated that the one or more mouth features may identify other parts of the mouth. The labeled target content may include one or more labels for the one or more mouth features and the one or more cheek features.

Referring back to FIG. 1, mouth feature component 118 may modify the labeled target content to match the dynamically captured content from the first capture device. Modifying the labeled target content for the one or more mouth features may include cropping the rotated target content such that the one or more mouth features are in cropped target content. The cropping may be similar to the cropping described above. As described above, cropping may include scaling the cropped image to match the size of the dynamically captured content.

Modifying the labeled target content for the one or more mouth features may include warping the cropped target content to match the dynamically captured content corresponding to the one or more mouth features. The warping may be similar to the warping described above. As described above, warping may include inpainting any empty regions in the warped target content that may have been caused by the warping or otherwise.

Figure 9:
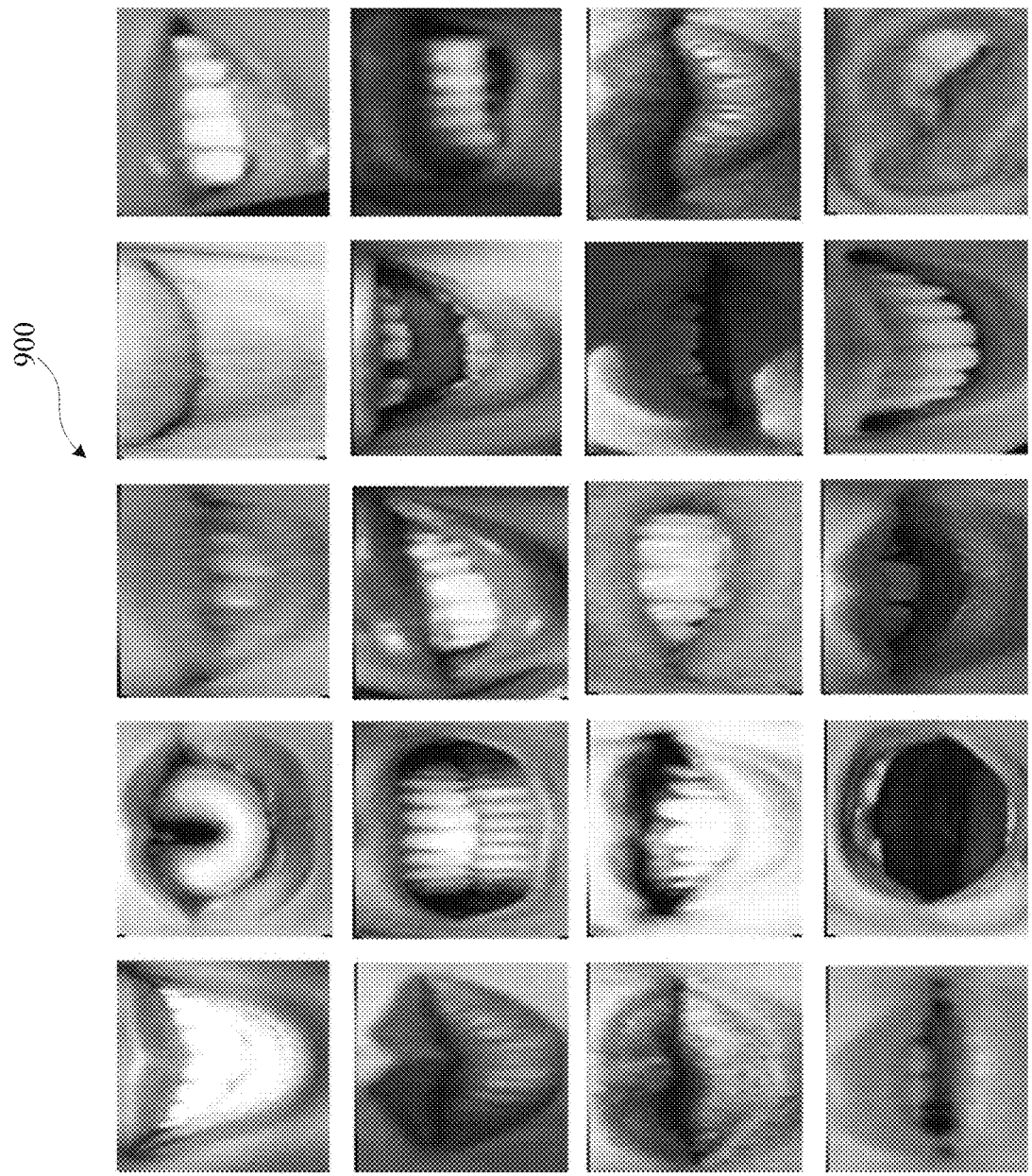
FIG. 9 illustrates example modified target mouth content, in accordance with various embodiments of the present disclosure.

The modification to the labeled target content may be applied to all of the labeled target content to generate modified target content. Mouth feature component 118 may store modified target content which can be used as training content for dynamically captured content from the first capture device. For example, FIG. 9 illustrates example modified target mouth content, in accordance with various embodiments of the present disclosure.

In embodiments, referring back to FIG. 1, mouth feature component 118 may generate the one or more mouth features in the dynamically captured content using the modified target content. Generating the one or more mouth features in the dynamically captured content using the modified target content may include using the dynamically captured content corresponding to the mouth (e.g., the capture device that captures the mouth). Using the modified target content corresponding to the mouth as training content, an estimate of a position for the one or more mouth features can be generated. Using a bounding box for the mouth as input, the mouth feature prediction algorithm may be used to generate the one or more mouth features for the dynamically captured content. The mouth feature prediction algorithm may estimate the one or more mouth features based on an ensemble of regression trees. The ensemble may have a learning rate of about 0.1, a tree depth of about 4, a cascade depth of about 10, and a number of trees per cascade level of about 500. The mouth feature prediction algorithm may be separate from the eye feature prediction algorithm In embodiments, generating the one or more mouth features in the dynamically captured content using the modified target content may include estimating a bounding box around the mouth in the dynamically captured content using one or more mouth parameters to generate the one or more mouth features. In some embodiments, the one or more mouth parameters may include a position on the face (e.g., a lower half of a face), a shape of a mouth (e.g., two curves meeting at the end, circular, oval, etc.), a color change (e.g., skin tone to lips), a texture change (e.g., reflectivity, roughness, smoothness, etc.), segmentation (e.g., color space segmentation, histogram segmentation, chromatism segmentation, etc.), and/or other parameters. In embodiments, the parameters may be used to estimate a bounding box.

Figure 10:
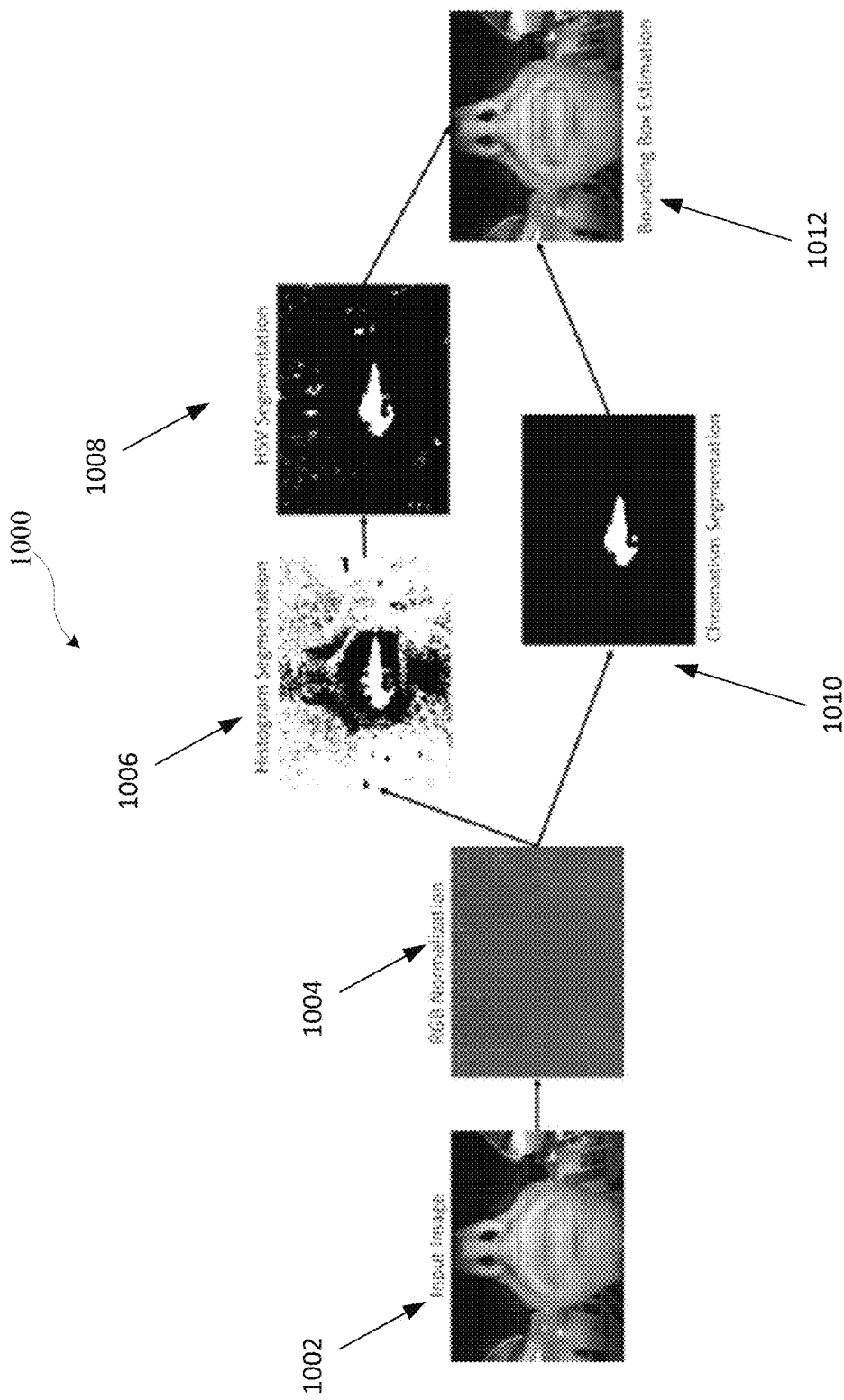
FIG. 10 illustrates an example bounding box estimation workflow, in accordance with various embodiments of the present disclosure.

FIG. 10 illustrates example bounding box estimation workflow 1000, in accordance with various embodiments of the present disclosure. 1002 illustrates an example input image, or dynamically captured content corresponding to the mouth. 1004 illustrates normalizing the dynamically captured content (e.g., RGB normalization). 1006 may illustrate histogram segmentation. Histogram segmentation may include generating a histogram of the converted captured content and/or comparing the histogram against an adaptive threshold value to select skin pixels. For example, for converted captured content, that may include segmented captured content with pixels p and a histogram with bin value h(i), a given pixel may be classified as a skin pixel should one or more of the following conditions be met:

$$h(x) > \frac{h_{max}}{4}$$

and $$X > \frac{h_{high} + h_{low}}{2}$$

where $H_{max}$ may represent a maximum bin value, $h_{high}$ may represent the last histogram bin with more than 1 pixel, and $h_{low}$ may represent the first histogram bin with more than 1 pixel.

1008 may illustrate color space segmentation. Color space segmentation may include converting the normalized captured content into another color space (e.g., HSV color space). The converted captured content may be filtered by the H channel between about 0 and about 120. The filtered captured content may be subtracted from the histogram-segmented content described above. The contours of the subtracted content may be extracted to identify the mouth. For example, the contours may be extracted by using a convex hull approximation. It should be appreciated that other algorithms may be used to extract the contours.

1010 may illustrate chromatism segmentation. Chromatism segmentation may include filtering based on a threshold value. For example, the chromatism value, s, may be determined based on:

$$s = \frac{2\tan^{-1}\left(\frac{R-G}{R}\right)}{\pi}$$

where R may represent the red values of RGB, and G may represent the green values of RGB. An example threshold value to identify the mouth may be above 0 for s, the chromatism value.

In embodiments, the one or more segmentations may be used together to refine an estimate of the bounding box for the mouth. In some embodiments, dilation and erosion may be performed to remove noise from the one or more segmentations. A contour center of the mouth may be used to identify the mouth. The bounding box for the mouth may be identified using a maximum and a minimum contour point.

In one example, a mouth may be neutral in a first frame, smiling in a second frame, frowning in a third frame, and neutral in a fourth frame. The position of the one or more mouth features may change in the dynamically captured content. These changes may be identified by mouth feature component 118. It should be appreciated that finer changes may be identified than the list of three examples provided above based on the subtleties of moving different parts of the mouth.

In embodiments, using the modified target content, a mouth template comprising an average range of the one or more mouth features in the modified training content may be generated. Applying the mouth template to the dynamically captured content corresponding to the mouth may be used to generate the one or more mouth features for the dynamically captured content. The mouth template may be similar to the eye template described above, which allows for finer calibration (e.g., more accurate position of the one or more mouth features and a higher rate of re-calibration of the mouth template). In some embodiments, the mouth template may be used as a filter, by scanning the mouth template across multiple positions of the dynamically captured content to identify shapes that are within a threshold value of the mouth template shape. Using a center of the identified mouth shapes, a bounding box may be generated and placed around the center of the identified mouth shapes to limit the application of the mouth template to the bounding box. The mouth template may be used on identified mouth shapes in the dynamically captured content to generate the one or more mouth features for the dynamically captured content, as described above.

In embodiments, mouth feature component 118 may dynamically generate a representation of a face based on the dynamically captured content. In some embodiments, mouth feature component 118 may display the representation. This may be similar to the representation described in greater detail above.

Electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content and/or representations to a user and/or receive requests to send content and/or representations to another user. In some embodiments, electronic device 102 may apply facial feature component 114, eye feature component 116, and/or mouth feature component 118 to labeled target content, dynamically captured content, and/or representations. In embodiments, electronic device 102 may store content, representations, models, algorithms, and related information of facial feature component 114, eye feature component 116, and/or mouth feature component 118, as well as facial feature component 114, eye feature component 116, and/or mouth feature component 118 themselves.

Capture device 103 may include one or more capture devices, such as, for example, an RGB camera, IR camera, an IR illuminator, a video camera, a phone camera, a digital single lens reflect camera, a film camera, a head mounted camera, a 360 degree camera, and/or other cameras. The cameras may capture content at various resolutions, such as those described above. The cameras may use one or more lenses, such as, for example, a fisheye lens, wide-angle lenses, a prime lens, a zoom lens, a telephoto lens, and/or other lenses that cause different types of distortion to the dynamically captured content. For example, a fisheye lens may cause more spherical distortion to the dynamically captured content than a prime lens. The lenses may capture different degrees of an area, which can also affect distortion of the dynamically captured content. For example, a 360 degree camera may create lens distortions. In embodiments, the cameras may be mounted, or otherwise coupled, to robots and/or autonomous vehicles.

As shown in FIG. 1, environment 100 may include one or more of electronic device 102, capture device 103, and server system 106. Electronic device 102 and/or capture device 103 can be coupled to server system 106 via communication media 104. As will be described in detail herein, electronic device 102, capture device 103, and/or server system 106 may exchange communications signals, including content (e.g., labeled target content, dynamically captured content, converted content, normalized content, segmented content, etc.), representations, metadata, algorithms, modifications (e.g., rotating, cropping, warping, etc.), user input, bounding boxes, and/or other information via communication media 104.

In various embodiments, communication media 104 may be based on one or more wireless communication protocols such as Wi-Fi, Bluetooth®, ZigBee, 802.11 protocols, IR, Radio Frequency (RF), 2G, 3G, 4G, 5G, etc., and/or wired protocols and media. Communication media 104 may be implemented as a single medium in some cases.

As mentioned above, communication media 104 may be used to connect or communicatively couple electronic device 102, capture device 103, and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, processor 112, facial feature component 114, eye feature component 116, and/or mouth feature component 118 to one another in addition to other elements of environment 100. In example implementations, communication media 104 may be or include a wired or wireless wide area network (e.g., cellular, fiber, and/or circuit-switched connection, etc.) for electronic device 102, capture device 103, and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102 and/or capture device 103, such as, for example, content (e.g., labeled target content, dynamically captured content, converted content, normalized content, segmented content, etc.), representations, metadata, algorithms, modifications (e.g., rotating, cropping, warping, etc.), user input, bounding boxes, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102 and/or capture device 103. Processor 112 may include facial feature component 114, eye feature component 116, and/or mouth feature component 118 capable of receiving labeled target content, dynamically captured content, and/or representations, analyzing labeled target content, dynamically captured content, and/or representations, and otherwise processing content, dynamically captured content, and/or representations and generating information, content, and/or representations that server system 106 has collected, received, etc. based on requests from, or coming from, electronic device 102 and/or capture device 103. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, a component, or the like, and may be implemented in various forms, including, for example, in an integrated circuit or collection thereof, in a printed circuit board or collection thereof, or in a discrete housing/package/rack or multiple of the same. Server 108 may update information stored on electronic device 102 and/or capture device 103. Server 108 may send/receive information to/from electronic device 102 and/or capture device 103 in real-time or sporadically. Further, server 108 may implement cloud computing capabilities for electronic device 102 and/or capture device 103. Upon studying the present disclosure, one of skill in the art will appreciate that environment 100 may include multiple electronic devices 102, capture devices 103, communication media 104, server systems 106, servers 108, storage 110, processors 112, facial feature components 114, eye feature components 116, and/or mouth feature components 118.

Figure 11:
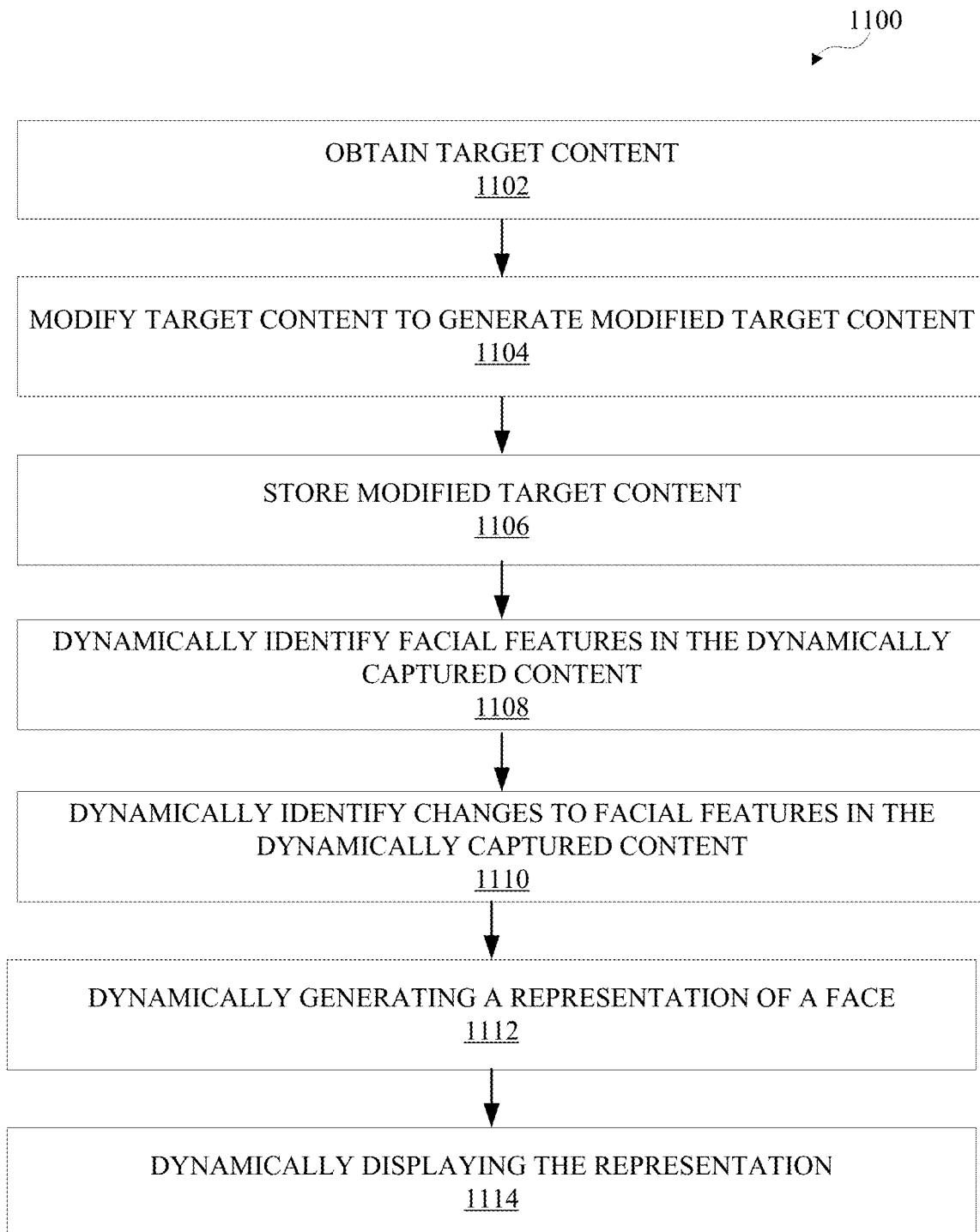
FIG. 11 is an operational flow diagram illustrating an example process for modifying labeled content for a capture device, in accordance with one embodiment.

FIG. 11 is an operational flow diagram illustrating an example process for modifying labeled content for a capture device, in accordance with one embodiment. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 2100, described herein and referenced with respect to at least FIGS. 1 and 21, as well as subcomponents, elements, devices, components, and circuitry depicted therein and/or described with respect thereto.

In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At 1102, labeled target content may be obtained. The labeled target content may include an image, a video, and/or other media content. The labeled target content may include features of one or more people, such as, for example, facial features. The labeled target content may include one or more pre-labeled facial features, eye features, mouth features, cheek features, etc.

At 1104, the labeled target content may be modified to generate modified target content. As described above, the labeled target content may be rotated, cropped, warped, etc. to match the corresponding parts of the face in the dynamically captured content.

At 1106, the modified target content may be stored.

At 1108, the one or more facial features in the dynamically captured content may be generated. The first capture device used to captured the dynamically captured content may be different (e.g., different distortions on the content) from the second capture device(s) used to capture the labeled target content. In embodiments, the capture device used to capture the dynamically captured content may include a RGB camera, an IR camera, and an IR illuminator. Using the modified target content as training content, the one or more facial features, etc. can be generated by estimating a bounding box for different parts of the face, converting the dynamically captured content, normalizing the dynamically captured content, segmenting the dynamically captured content, etc. The generation may occur in real-time. In some embodiments, the generation may occur at the beginning of a session to calibrate the first capture device. The one or more facial features may change by frame, which may include a change in position of the one or more facial features, etc., whether an eye is open or closed, a position of a pupil, or other changes, as described above.

At 1110, a representation of a face may be dynamically generated. The representation may change how the eyes, mouth, and face move corresponding to the dynamically captured content and/or the one or more generated facial features, as described above.

At 1112, the representation may be displayed.

Figure 12:
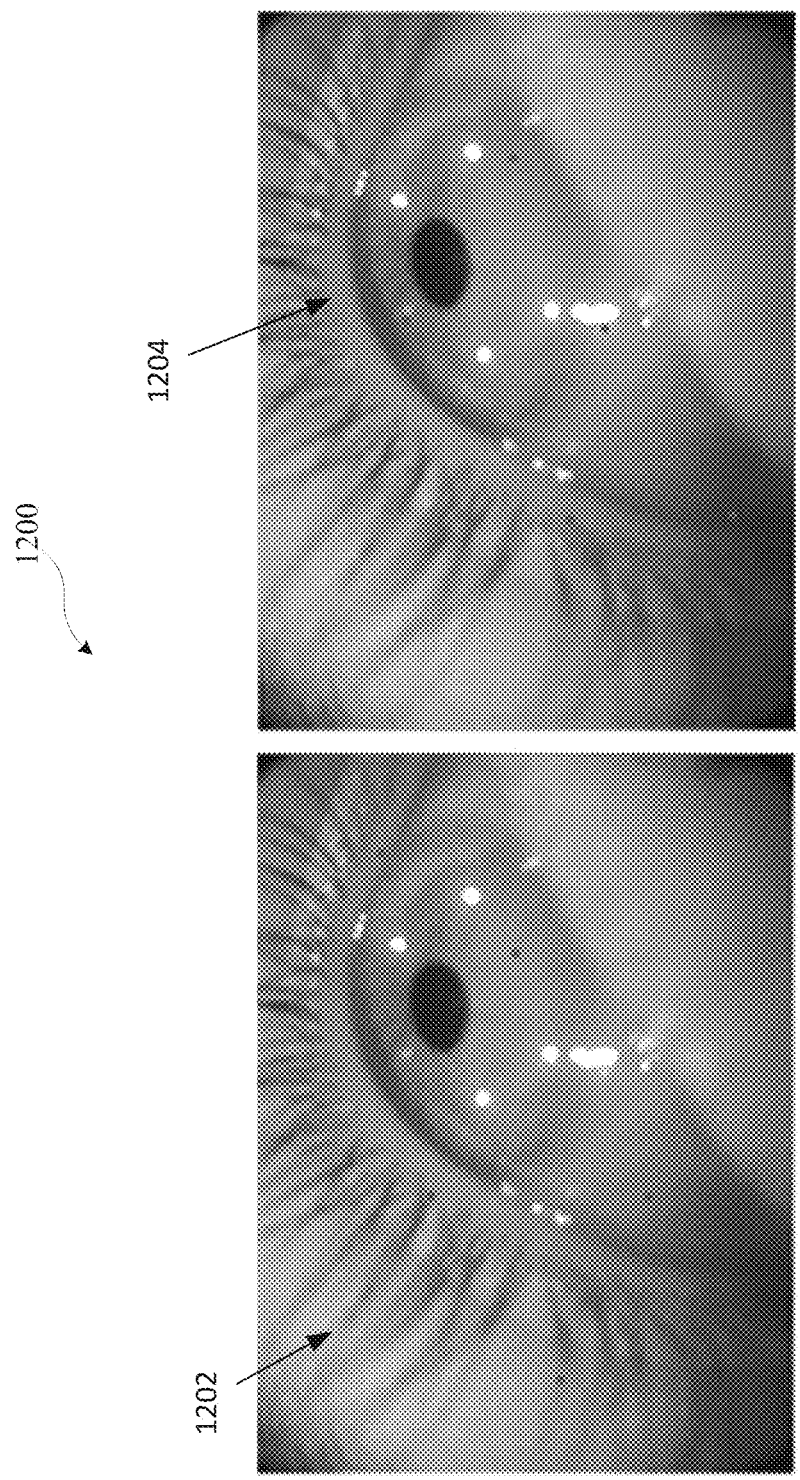
FIG. 12 illustrates a comparison between different eye feature predictors.

FIG. 12 illustrates a comparison between different eye feature predictors. 1202 illustrates the eye predictor predicting six eye features using the target content. 1204 illustrates the eye predictor predicting six eye features using the modified target content. 1204 more accurately identifies the eye features than 1202.

Figure 13:
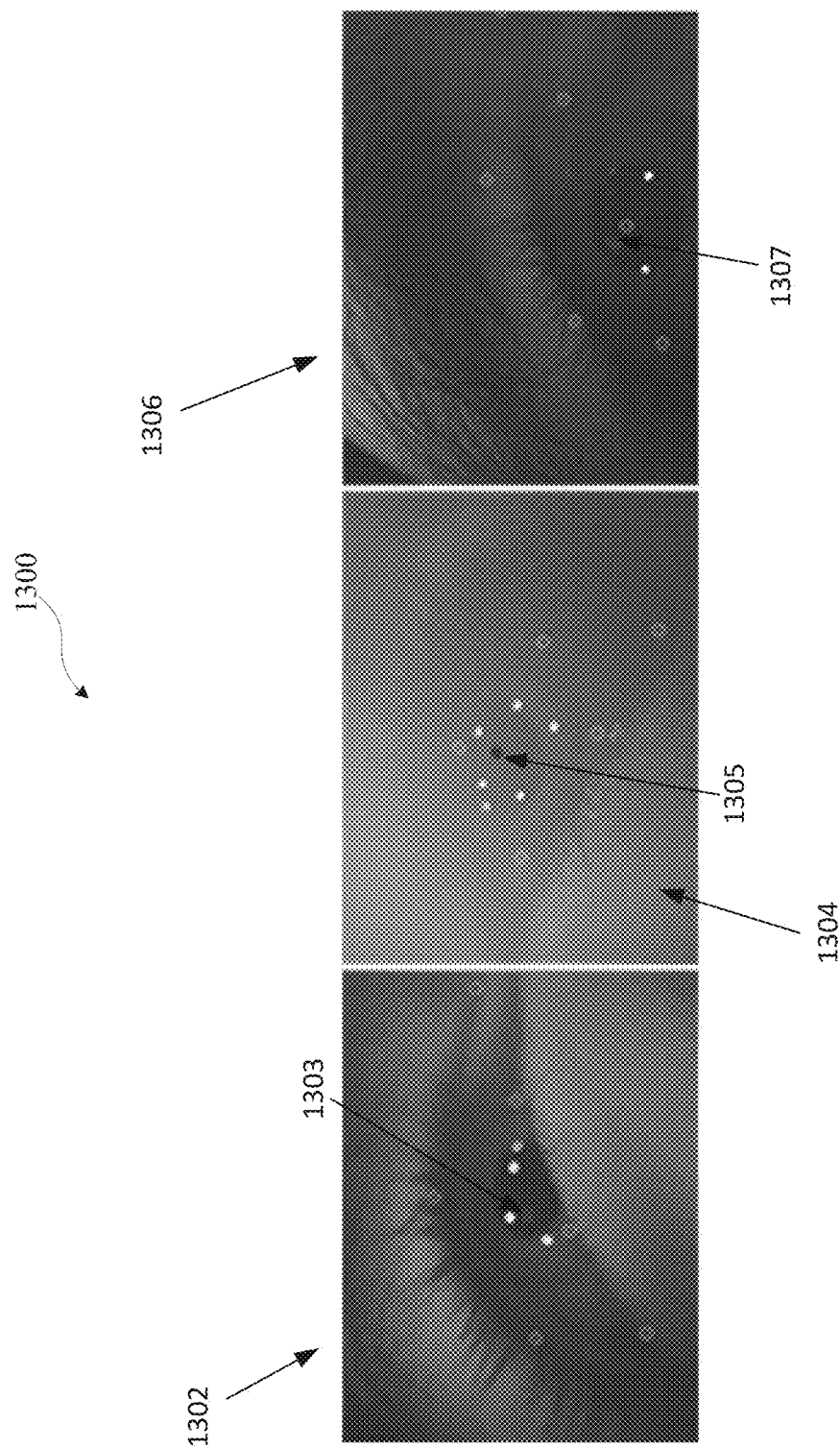
FIG. 13 illustrates a comparison between different eye feature predictors.

FIG. 13 illustrates a comparison between different eyes. 1302 illustrates a first eye with seven eye features. The eye features may include pupil feature 1303. 1304 illustrates a second eye with seven eye features. 1306 illustrates a third eye with seven eye features.

Figure 14:
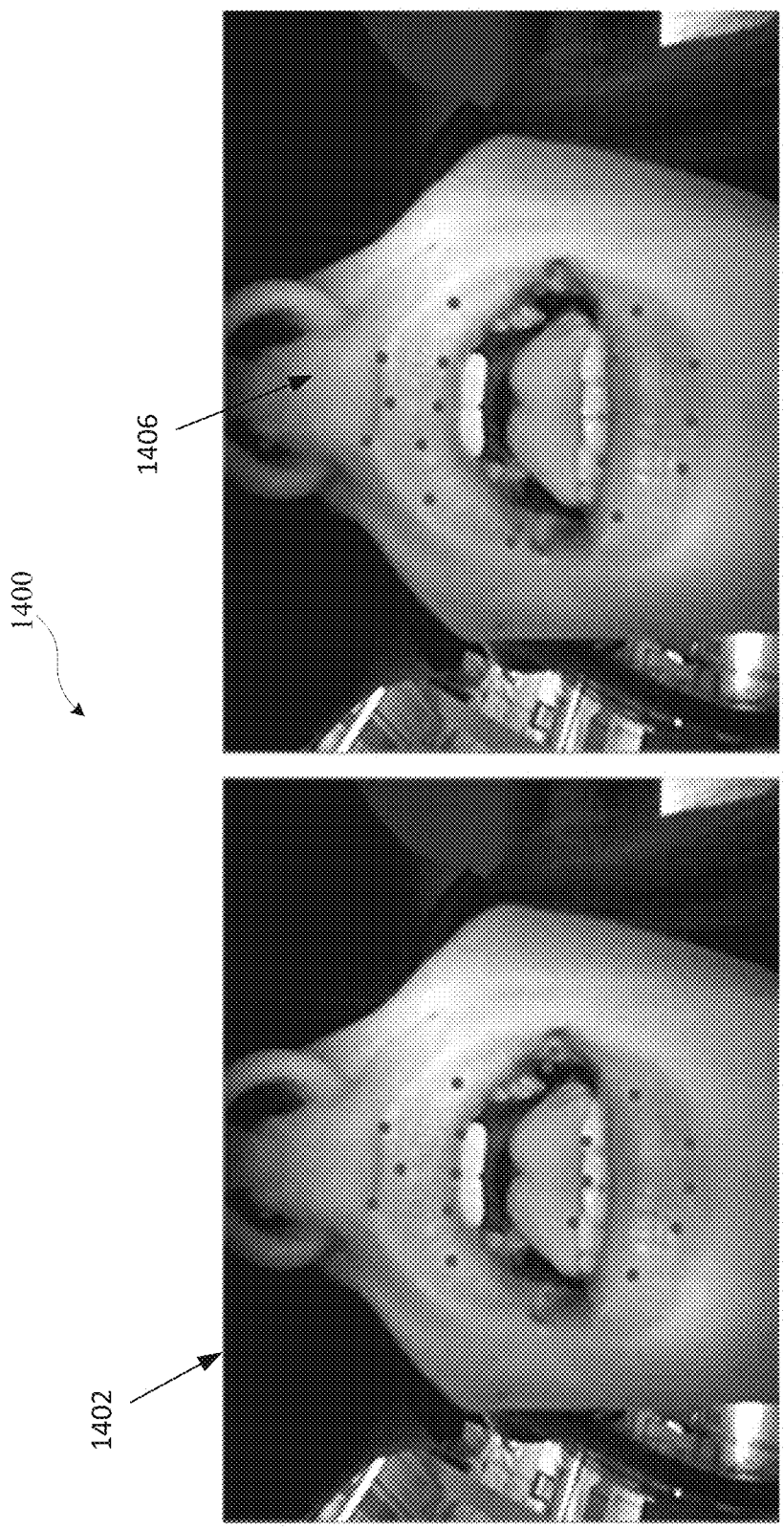
FIG. 14 illustrates a comparison between different mouth feature predictors.
Figure 15:
FIG. 15 illustrates an example representation with dynamically captured content, in accordance with various embodiments of the present disclosure.
Figure 16:
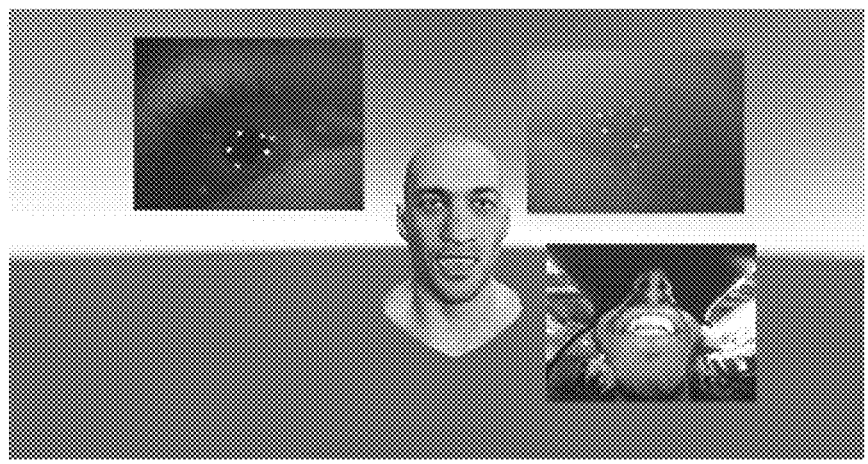
FIG. 16 illustrates an example representation with dynamically captured content, in accordance with various embodiments of the present disclosure.
Figure 17:
FIG. 17 illustrates an example representation with dynamically captured content, in accordance with various embodiments of the present disclosure.
Figure 18:
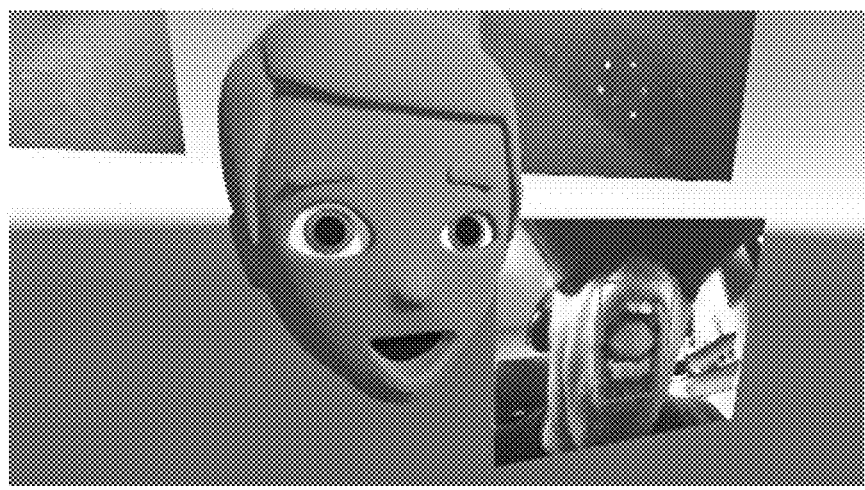
FIG. 18 illustrates an example representation with dynamically captured content, in accordance with various embodiments of the present disclosure.
Figure 19:
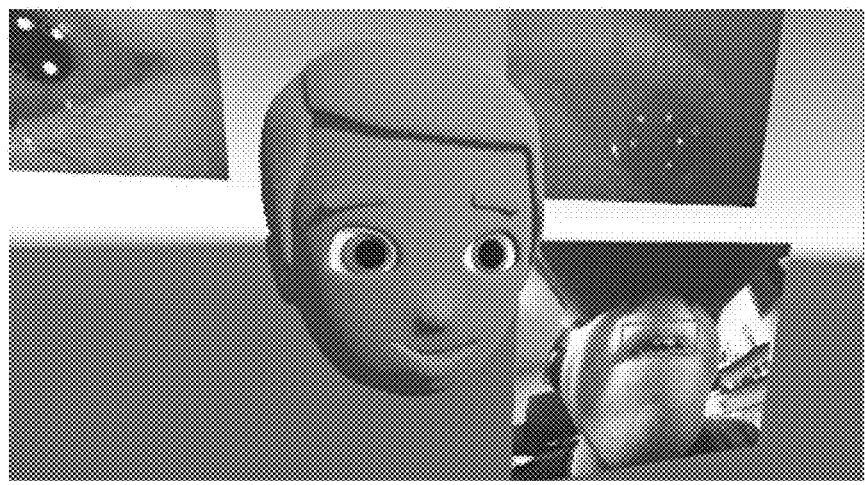
FIG. 19 illustrates an example representation with dynamically captured content, in accordance with various embodiments of the present disclosure.
Figure 20:
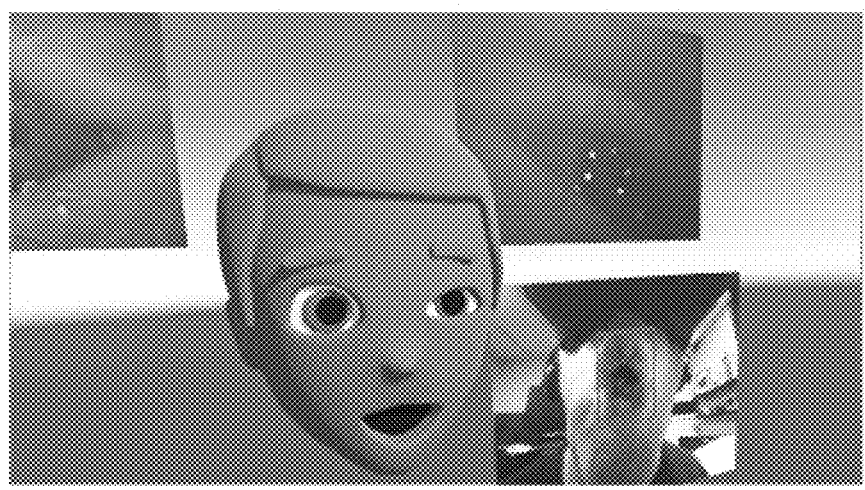
FIG. 20 illustrates an example representation with dynamically captured content, in accordance with various embodiments of the present disclosure.

FIG. 14 illustrates a comparison between different mouth feature predictors. 1402 illustrates the mouth predictor predicting twenty mouth features using the target content. 1404 illustrates the eye predictor predicting twenty mouth features using the modified target content. 1404 more accurately identifies the mouth features than 1402.

FIGS. 15-20 illustrate example representations with dynamically captured content, in accordance with various embodiments of the present disclosure. The representations displayed may be simulating the person's actions captured in the dynamically captured content. The dynamically captured content for individual eyes and the mouth may be overlaid in the virtual environment of the representation. Six eye features per eye are used and twenty mouth features are used. The bounding box is illustrated for the mouth as well.

Figure 21:
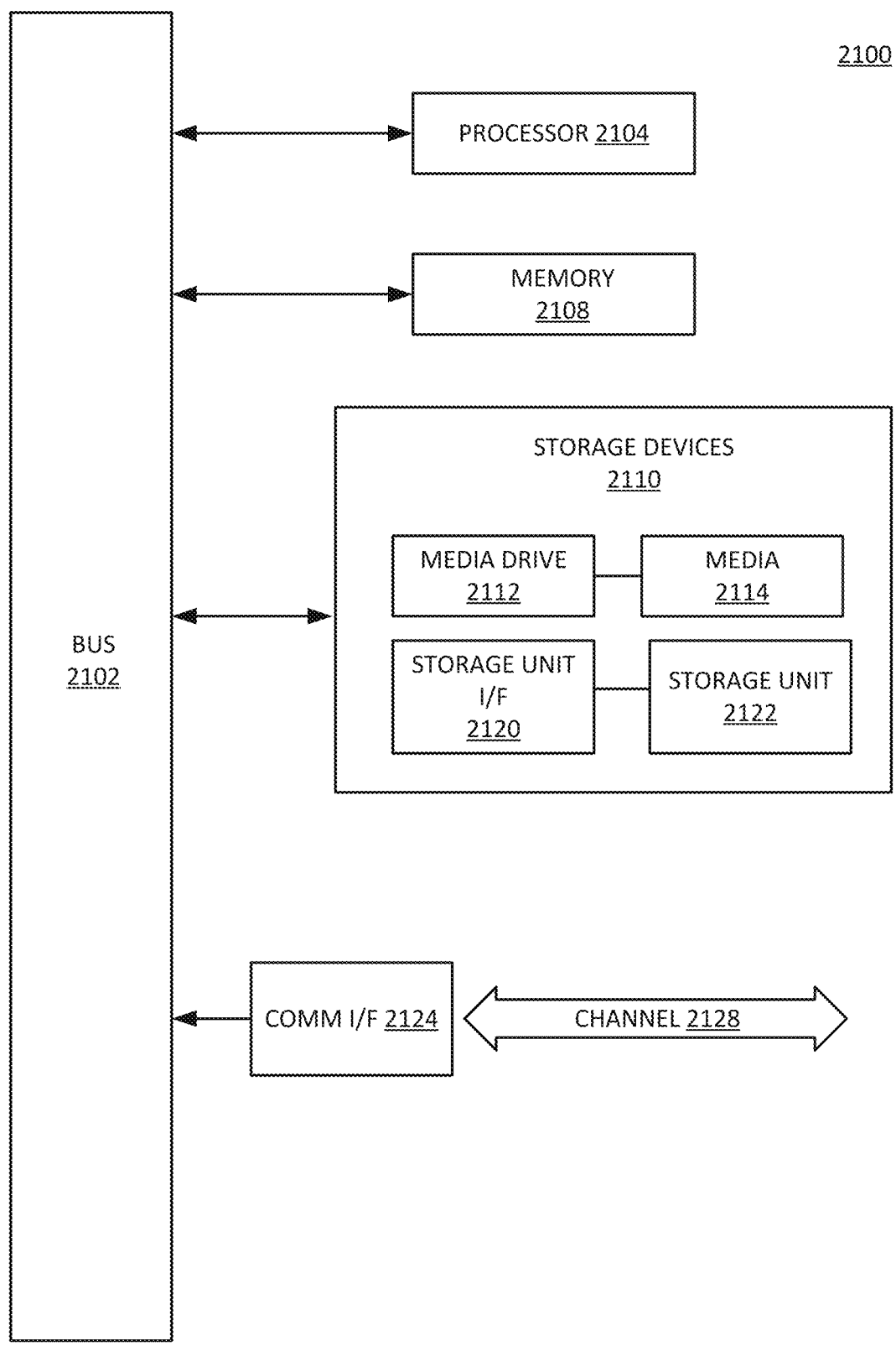
FIG. 21 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 21. Various embodiments are described in terms of this example-computing component 2100. After reading this description, it will become apparent to a person skilled in the relevant art how to implement the technology using other computing components or architectures.

Referring now to FIG. 21, computing component 2100 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Computing component 2100 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 2100 might include, for example, one or more processors, controllers, control components, or other processing devices, such as a processor 2104. Processor 2104 might be implemented using a general-purpose or special-purpose processing engine such as, for example, a physical computer processor, microprocessor, controller, or other control logic. In the illustrated example, processor 2104 is connected to a bus 2102, although any communication medium can be used to facilitate interaction with other components of computing component 2100 or to communicate externally.

Computing component 2100 might also include one or more memory components, simply referred to herein as main memory 2108. For example, preferably random access memory (RAM) or other dynamic memory might be used for storing information and instructions to be executed by processor 2104. Main memory 2108 might also be used for storing temporary variables or other intermediate information during execution of instructions to be executed by processor 2104. Computing component 2100 might likewise include a read-only memory ("ROM") or other static storage device coupled to bus 2102 for storing static information and instructions for processor 2104.

The computing component 2100 might also include one or more various forms of information storage device 2110, which might include, for example, a media drive 2112 and a storage unit interface 2120. The media drive 2112 might include a drive or other mechanism to support fixed or removable storage media 2114. For example, a hard disk drive, a floppy disk drive, a magnetic tape drive, an optical disk drive, a CD or DVD drive (R or RW), or other removable or fixed media drive might be provided. Accordingly, storage media 2114 might include, for example, non-transient electronic storage, a hard disk, a floppy disk, magnetic tape, cartridge, optical disk, a CD or DVD, or other fixed or removable medium that is read by, written to, or accessed by media drive 2112. As these examples illustrate, the storage media 2114 can include a computer usable storage medium having stored therein computer software or data.

In alternative embodiments, information storage mechanism 2110 might include other similar instrumentalities for allowing computer programs or other instructions or data to be loaded into computing component 2100. Such instrumentalities might include, for example, a fixed or removable storage unit 2122 and an interface 2120. Examples of such storage units 2122 and interfaces 2120 can include a program cartridge and cartridge interface, a removable memory (for example, a flash memory or other removable memory component) and memory slot, a PCMCIA slot and card, and other fixed or removable storage units 2122 and interfaces 2120 that allow software and data to be transferred from the storage unit 2122 to computing component 2100.

Computing component 2100 might also include a communications interface 2124. Communications interface 2124 might be used to allow software and data to be transferred between computing component 2100 and external devices. Examples of communications interface 2124 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 2124 might typically be carried on signals, which can be electronic, electromagnetic (which includes optical), or other signals capable of being exchanged by a given communications interface 2124. These signals might be provided to communications interface 2124 via channel 2128. This channel 2128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2108, storage unit 2120, media 2114, and channel 2128. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing component 2100 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for modifying labeled target content, the method being implemented in a computer system that comprises a storage, one or more physical computer processors, and a graphical user interface, the method comprising:

obtaining, from the storage, labeled target content from a first capture device, the labeled target content comprising one or more first facial features that have been labeled;

modifying, with the one or more physical computer processors, the labeled target content to match dynamically captured content from a second capture device to generate modified target content, wherein the second capture device is different from the first capture device;

estimating, with the one or more physical computer processors, one or more bounding boxes in the dynamically captured content based on the modified target content; and generating one or more second facial features for the dynamically captured content based on the one or more bounding boxes.

2. The computer-implemented method of claim 1, wherein the one or more first facial features comprise one or more mouth features.

3. The computer-implemented method of claim 2, wherein modifying the labeled target content comprises:

cropping, with the one or more physical computer processors, the labeled target content such that the one or more mouth features are in cropped target content; and warping, with the one or more physical computer processors, the cropped target content to match one or more parts of the dynamically captured content that correspond to the one or more mouth features.

4. The computer-implemented method of claim 1, wherein the one or more first facial features comprises one or more eye features.

5. The computer-implemented method of claim 4, wherein modifying the labeled target content comprises:
   rotating, with the one or more physical computer processors, the labeled target content based on an angle of the dynamically captured content to generate rotated target content;
   cropping, with the one or more physical computer processors, the rotated target content such that the one or more eye features are in cropped target content; and
   warping, with the one or more physical computer processors, the cropped target content to match one or more parts of the dynamically captured content that correspond to the one or more eye features.

6. The computer-implemented method of claim 1, wherein the one or more first facial features comprise one or more eye features, and
wherein generating the one or more second facial features comprises:
   estimating, with the one or more physical computer processors, the one or more bounding boxes around parts of a face in the dynamically captured content using one or more facial parameters in the dynamically captured content to generate the one or more second facial features from the dynamically captured content, wherein the one or more facial parameters comprise one or more of a color, a curve, or a reflected light intensity;
   generating, with the one or more physical computer processors, the one or more second facial features in the dynamically captured content using the one or more bounding boxes;
   identifying, with the one or more physical computer processors, a closed eye when a given image in converted captured content is within a first threshold range, wherein the converted captured content is derived from the dynamically captured content; and
   generating, with the one or more physical computer processors, a position of a pupil when a portion of the given image in the converted captured content is within a second threshold range.

7. The computer-implemented method of claim 1, further comprising:
   dynamically generating, with the one or more physical computer processors, a representation of a face using visual effects to depict the one or more second facial features; and
   displaying, via the graphical user interface, the representation.

8. The computer-implemented method of claim 1, wherein modifying the labeled target content comprises converting, with the one or more physical computer processors, the labeled target content into converted content, wherein the converted content uses a different color format than the labeled target content.

9. The computer-implemented method of claim 1, wherein the second capture device comprises a red-green-blue camera, an infrared camera, an infrared illuminator, or a combination thereof.

10. The computer-implemented method of claim 1, further comprising:
   dynamically generating, with the one or more physical computer processors, a representation of a face using visual effects to depict the one or more second facial features or changes to the one or more second facial features.

11. The computer-implemented method of claim 10, wherein the one or more first facial features comprise one or more mouth features, and
wherein modifying the labeled target content comprises:
   cropping, with the one or more physical computer processors, the labeled target content such that the one or more mouth features are in cropped target content; and
   warping, with the one or more physical computer processors, the cropped target content to match one or more parts of the dynamically captured content that correspond to the one or more mouth features.

12. The computer-implemented method of claim 10, wherein the one or more first facial features comprise one or more eye features, and
wherein modifying the labeled target content comprises:
   rotating, with the one or more physical computer processors, the labeled target content based on an angle of the dynamically captured content to generate rotated target content;
   cropping, with the one or more physical computer processors, the rotated target content such that the one or more eye features are in cropped target content; and
   warping, with the one or more physical computer processors, the cropped target content to match one or more parts of the dynamically captured content that correspond to the one or more eye features.

13. The computer-implemented method of claim 10, wherein the one or more first facial features comprise one or more eye features, and
wherein generating the one or more second facial features comprises:
   estimating, with the one or more physical computer processors, the one or more bounding boxes around parts of a face in the dynamically captured content using one or more facial parameters in the dynamically captured content, wherein the one or more facial parameters comprise one or more of a color, a curve, or a reflected light intensity;
   generating, with the one or more physical computer processors, the one or more second facial features in the dynamically captured content using the one or more bounding boxes;
   identifying, with the one or more physical computer processors, a closed eye when a given image in converted captured content is within a first threshold range, wherein the converted captured content is derived from the dynamically captured content; and
   generating, with the one or more physical computer processors, a position of a pupil when a portion of the given image in the converted captured content is within a second threshold range.

14. The computer-implemented method of claim 10, wherein the second capture device comprises a head mounted display, and
wherein the head mounted display comprises a red-green-blue camera, an infrared camera, an infrared illuminator, or a combination thereof.

15. A computer-implemented method for modifying labeled target content for a capture device, the method being implemented in a computer system that comprises a storage, one or more physical computer processors, and a graphical user interface, the method comprising:

obtaining, from the storage, labeled target content, the labeled target content comprising one or more first facial features that have been labeled;

modifying, with the one or more physical computer processors, the labeled target content to match dynamically captured content from a first capture device to generate modified target content;

estimating, with the one or more physical computer processors, one or more bounding boxes in the dynamically captured content based on the modified target content; and generating one or more second facial features for the dynamically captured content based on the one or more bounding boxes, wherein the dynamically captured content includes a first distortion associated with the first capture device and the labeled target content includes a second distortion associated with a second capture device used to capture the labeled target content.

16. A system to modify labeled target content, the system comprising:

a storage;

a graphical user interface; and one or more physical computer processors configured by machine-readable instructions to:

obtain, from the storage, labeled target content from a first capture device, the labeled target content comprising one or more first facial features that have been labeled;

modify, with the one or more physical computer processors, the labeled target content to match dynamically captured content from a second capture device to generate modified target content, wherein the second capture device is different from the first capture device;

estimate one or more bounding boxes in the dynamically captured content based on the modified target content; and generate one or more second facial features for the dynamically captured content based on the one or more bounding boxes.

17. The system of claim 16, wherein the one or more first facial features comprise one or more mouth features, and wherein modifying the labeled target content comprises:

cropping, with the one or more physical computer processors, the labeled target content such that the one or more mouth features are in cropped target content; and warping, with the one or more physical computer processors, the cropped target content to match one or more parts of the dynamically captured content that correspond to the one or more mouth features.

18. The system of claim 16, wherein the one or more first facial features comprise one or more eye features, and wherein modifying the labeled target content comprises:

rotating, with the one or more physical computer processors, the labeled target content based on an angle of the dynamically captured content to generate rotated target content;

cropping, with the one or more physical computer processors, the rotated target content such that the one or more eye features are in cropped target content; and warping, with the one or more physical computer processors, the cropped target content to match one or more parts of the dynamically captured content that correspond to the one or more eye features.

19. The system of claim 16, wherein the one or more first facial features comprise one or more eye features, and wherein the one or more physical computer processors are further configured by the machine-readable instructions to:

estimate the one or more bounding boxes around parts of a face in the dynamically captured content using one or more facial parameters in the dynamically captured content, wherein the one or more facial parameters comprise one or more of a color, a curve, or a reflected light intensity;

identify a closed eye when a given image in converted captured content is within a first threshold range, wherein the converted captured content is derived from the dynamically captured content; and generate a position of a pupil when a portion of the given image in the converted captured content is within a second threshold range.

* * * * *